(12) United States Patent
Sirpal et al.

(10) Patent No.: US 10,547,570 B2
(45) Date of Patent: Jan. 28, 2020

(54) SYSTEM AND METHODS FOR CARD ELEMENT APPLICATION OPERATION

(71) Applicants: Jamdeo Canada Ltd., Oakville (CA); Qingdao Hisense Electronics Co., Ltd., Qingdao, Shandong (CN); Hisense USA CORP., Suwanee, GA (US); Hisense International Co., Ltd.

(72) Inventors: Sanjiv Sirpal, Oakville (CA); Mohammed Selim, Oakville (CA); Alexander De Paz, Burlington (CA); Salvador Soto, Toronto (CA); Sergii Grysenko, Burlington (CA)

(73) Assignee: Qingdao Hisense Electronics Co., Ltd., Qingdao (CN)

(*) Notice: Subject to any disclaimer, the term of this patent is extended or adjusted under 35 U.S.C. 154(b) by 407 days.

(21) Appl. No.: 14/829,893

(22) Filed: Aug. 19, 2015

(65) Prior Publication Data
US 2016/0231973 A1 Aug. 11, 2016

Related U.S. Application Data

(60) Provisional application No. 62/113,225, filed on Feb. 6, 2015.

(51) Int. Cl.
*H04L 12/58* (2006.01)
*H04L 29/08* (2006.01)
(Continued)

(52) U.S. Cl.
CPC ............ *H04L 51/046* (2013.01); *G06F 3/017* (2013.01); *G06F 3/0481* (2013.01);
(Continued)

(58) Field of Classification Search
CPC .... G06F 3/0482; G06F 9/4443; G06F 3/0486; G06F 9/452; G06Q 30/0261; G06Q 10/10; H04M 1/27455; H04N 21/4131
See application file for complete search history.

(56) References Cited

U.S. PATENT DOCUMENTS 7,620,667 B2 * 11/2009 Rollin ............... G06F 17/30174
7,930,644 B2 * 4/2011 Silva ................... H04L 12/2809
715/771
(Continued)

*Primary Examiner* — Andrew L Tank
(74) *Attorney, Agent, or Firm* — Gordon & Rees LLP

(57) ABSTRACT

The present disclosure relates to systems, methods, electronic devices and applications for presentation, configuration and operation of an application including a user interface. In one embodiment, a method includes detecting a command for a user interface of the device, wherein the command is associated with a card element displayed by the user interface, wherein the user interface and card element are displayed by the device and wherein operation of device for presentation of the user interface is based on a platform for operation with card elements. The method also includes determining at least one operation of the device based on the command and the platform for operation with the card element, wherein determining includes interoperation of the user interface with the platform and controlling, by the controller, operation of the device based on said determining. Another embodiment is directed to a device configured to present a user interface.

20 Claims, 16 Drawing Sheets

(51) Int. Cl.

| | |
|---|---|
| *H04N 21/4402* | (2011.01) |
| *H04N 21/442* | (2011.01) |
| *H04N 21/45* | (2011.01) |
| *H04L 12/24* | (2006.01) |
| *G06F 3/0482* | (2013.01) |
| *G06F 3/0484* | (2013.01) |
| *G06F 3/0485* | (2013.01) |
| *G06F 3/0488* | (2013.01) |
| *G06F 3/0481* | (2013.01) |
| *G06F 3/01* | (2006.01) |
| *G06F 3/14* | (2006.01) |
| *G09G 5/00* | (2006.01) |
| *H04N 21/426* | (2011.01) |
| *H04N 21/458* | (2011.01) |
| *H04N 21/482* | (2011.01) |
| *H04N 21/488* | (2011.01) |
| *H04N 21/81* | (2011.01) |
| *H04L 12/28* | (2006.01) |

(52) U.S. Cl.
CPC .......... *G06F 3/0482* (2013.01); *G06F 3/0485* (2013.01); *G06F 3/04817* (2013.01); *G06F 3/04842* (2013.01); *G06F 3/04845* (2013.01); *G06F 3/04847* (2013.01); *G06F 3/04883* (2013.01); *G06F 3/1415* (2013.01); *G09G 5/005* (2013.01); *H04L 12/2807* (2013.01); *H04L 41/0806* (2013.01); *H04L 41/12* (2013.01); *H04L 41/22* (2013.01); *H04L 67/303* (2013.01); *H04L 67/306* (2013.01); *H04N 21/42653* (2013.01); *H04N 21/4402* (2013.01); *H04N 21/44227* (2013.01); *H04N 21/458* (2013.01); *H04N 21/4516* (2013.01); *H04N 21/4826* (2013.01); *H04N 21/4882* (2013.01); *H04N 21/812* (2013.01); *G09G 2354/00* (2013.01)

(56) References Cited

U.S. PATENT DOCUMENTS

| | | | | |
|---|---|---|---|---|
| 8,966,375 B2* | 2/2015 | Wasko | ............... | G06F 3/0482 715/740 |
| 8,994,985 B2* | 3/2015 | Young | ............... | G06F 3/1205 358/1.15 |
| 9,632,665 B2* | 4/2017 | Hatambeiki | ............... | G08C 17/02 |
| 9,733,804 B2* | 8/2017 | Huang | ............... | G06F 3/0484 |
| 2007/0078953 A1* | 4/2007 | Chai | ............... | G06F 9/451 709/219 |
| 2007/0082707 A1* | 4/2007 | Flynt | ............... | G06F 3/0481 455/564 |
| 2007/0113190 A1* | 5/2007 | Clark | ............... | G06F 9/452 715/748 |
| 2009/0282360 A1* | 11/2009 | Park | ............... | G06F 3/0482 715/786 |
| 2009/0322790 A1* | 12/2009 | Behar | ............... | G06F 1/162 345/659 |
| 2010/0095240 A1* | 4/2010 | Shiplacoff | ............... | G06F 3/0483 715/784 |
| 2010/0138763 A1* | 6/2010 | Kim | ............... | G06F 1/1626 715/765 |
| 2010/0299639 A1* | 11/2010 | Ramsay | ............... | G06F 3/0486 715/835 |
| 2010/0333008 A1* | 12/2010 | Taylor | ............... | G06F 3/0486 715/769 |
| 2011/0271332 A1* | 11/2011 | Jones | ............... | H04L 9/3247 726/7 |
| 2011/0289437 A1* | 11/2011 | Yuen | ............... | G06F 17/3089 715/762 |
| 2012/0151418 A1* | 6/2012 | Conzola | ............... | G06F 17/30637 715/853 |
| 2012/0257110 A1* | 10/2012 | Amundsen | ............... | H04N 5/44543 348/564 |
| 2013/0057587 A1* | 3/2013 | Leonard | ............... | G06F 3/0488 345/660 |
| 2013/0080956 A1* | 3/2013 | Sirpal | ............... | G06F 3/1438 715/769 |
| 2013/0106738 A1* | 5/2013 | Kim | ............... | H04N 21/4131 345/173 |
| 2014/0006967 A1* | 1/2014 | Arumugam | ............... | G06F 9/54 715/748 |
| 2014/0032722 A1* | 1/2014 | Snow | ............... | G06F 9/4445 709/220 |
| 2014/0040803 A1* | 2/2014 | Briand | ............... | G06F 3/0486 715/769 |
| 2014/0330881 A1* | 11/2014 | Stone | ............... | H04L 67/10 709/201 |
| 2014/0376452 A1* | 12/2014 | Li | ............... | H04W 4/21 370/328 |
| 2016/0334967 A1* | 11/2016 | Rottler | ............... | G06Q 10/10 |

\* cited by examiner

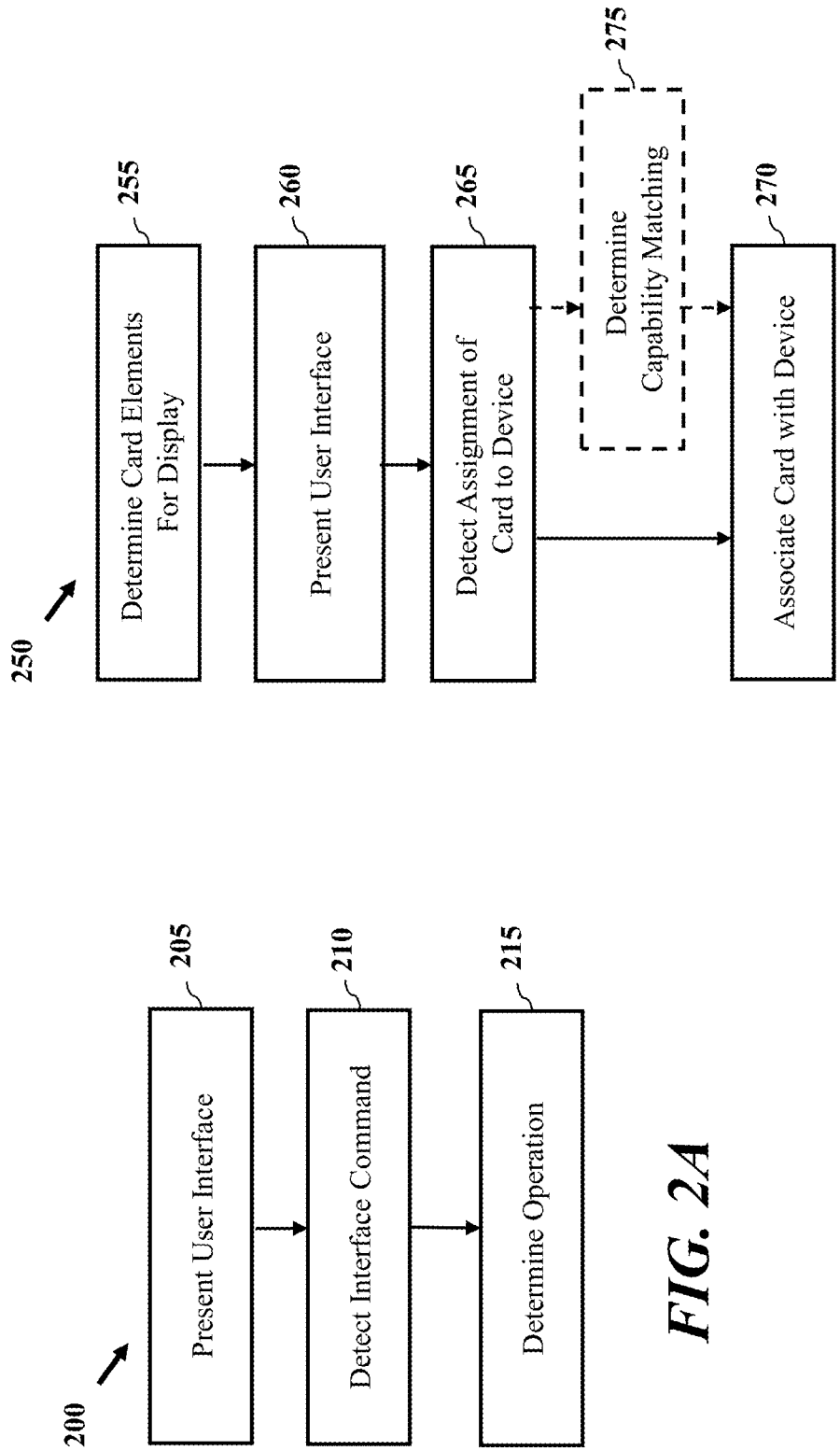

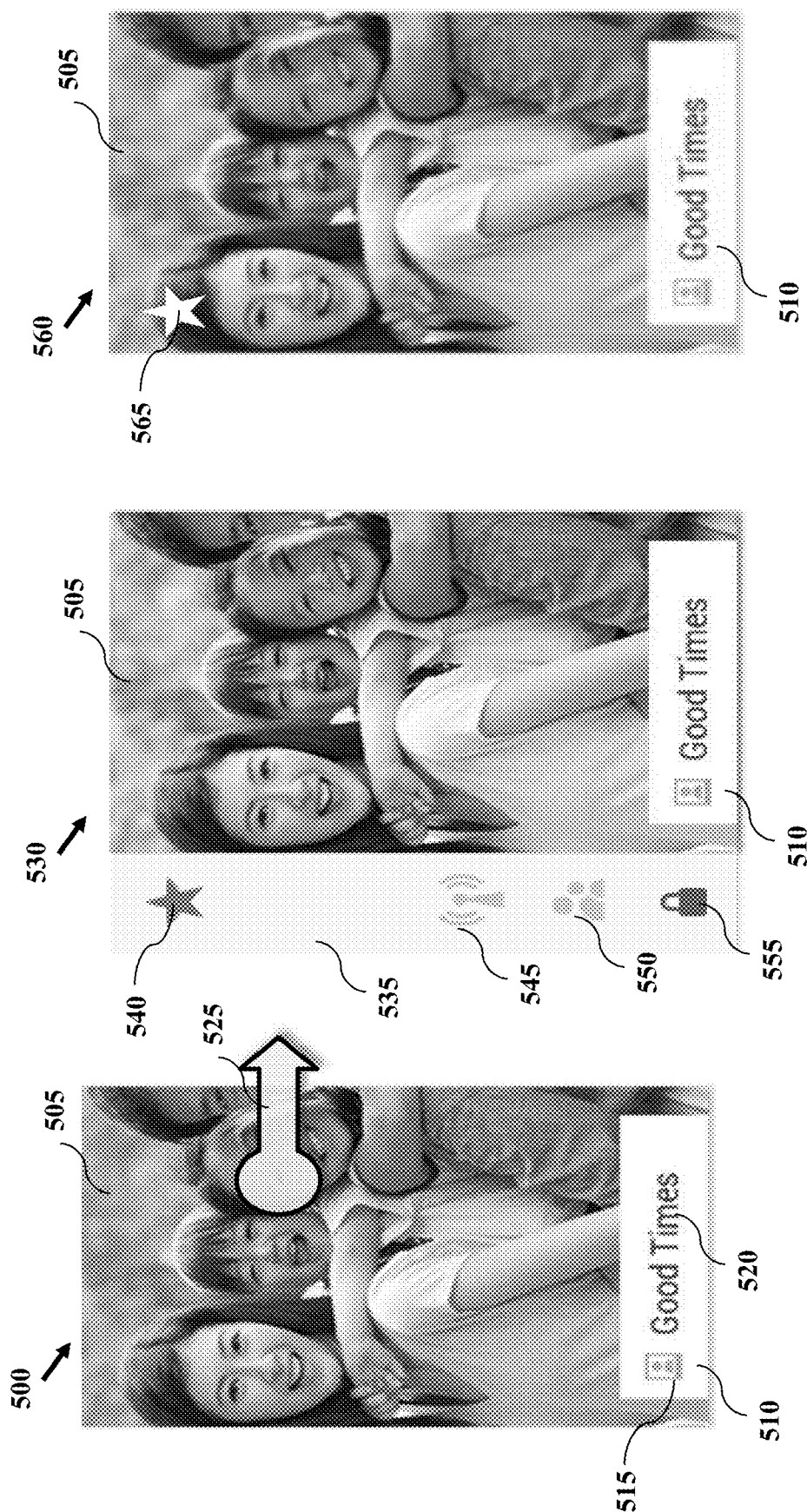

SYSTEM AND METHODS FOR CARD ELEMENT APPLICATION OPERATION

CROSS-REFERENCE TO RELATED APPLICATIONS

This application claims priority to U.S. Provisional Application No. 62/113,225 titled SYSTEM AND METHODS FOR AN APPLICATION CONFIGURATION AND PRESENTATION filed on Feb. 6, 2015, the content of which is expressly incorporated by reference in its entirety.

This application is related to the concurrently filed applications entitled: SYSTEM AND METHODS FOR APPLICATION USER INTERFACE PRESENTATION AND CARD ELEMENTS filed on Aug. 19, 2015 and assigned patent application Ser. No. 14/829,886; SYSTEM AND METHODS FOR CARD EXCHANGE AND USER INTERFACE PRESENTATION filed on Aug. 19, 2015 and assigned patent application Ser. No. 14/829,904; SYSTEM AND METHODS FOR CONTROL OF CARD ELEMENTS WITHIN AN APPLICATION USER INTERFACE filed on Aug. 19, 2015 and assigned patent application Ser. No. 14/829,914; SYSTEM AND METHODS FOR CARD INTERACTION AND ASSIGNING CARDS TO DEVICES filed on Aug. 19, 2015 and assigned patent application Ser. No. 14/829,923; SYSTEM AND METHODS FOR CARD INTERACTION AND ASSIGNING CARDS TO SPACES filed on Aug. 19, 2015 and assigned patent application Ser. No. 14/829,930; SYSTEMS AND METHODS FOR CONNECT TO CONTROL filed on Aug. 19, 2015 and assigned patent application Ser. No. 14/829,942; SYSTEMS AND METHODS FOR DEVICE TO DEVICE CONTROL filed on Aug. 19, 2015 and assigned patent application Ser. No. 14/829,955; SYSTEM AND METHODS FOR SETTINGS CARDS filed on Aug. 19, 2015 and assigned patent application Ser. No. 14/829,970; and SYSTEM AND METHODS FOR PRESENTATION OF A USER INTERFACE AND CARD ELEMENTS filed on Aug. 19, 2015 and assigned patent application Ser. No. 14/829,986, the disclosures of which are expressly incorporated by reference.

FIELD

The present disclosure relates to electronic devices and applications, and more particularly to methods and devices configured for exchange and communication for card elements and devices.

The present disclosure relates to electronic devices and applications, and more particularly to systems, devices and methods for application configuration and presentation

BACKGROUND

Technologies associated with network devices, and in particular personal devices, are implemented in various forms and accessible from many sources. Services for mobile communication can allow for portability of devices. While conventional systems allow for mobility, there are limitations on devices and device configurations. With respect to local networks, system components are also limited in many ways. Many conventional devices are not interoperable with other devices or network services. Connectivity of devices, or the lack of connectivity, in conventional systems can be a major drawback. Many user devices must be configured to interact with one another. In many cases, conventional communication protocols and configurations do not allow for connectivity.

BRIEF SUMMARY OF THE EMBODIMENTS

Disclosed and claimed herein are systems, methods and devices for controlling device operation based on card elements. One embodiment is directed to a method including detecting, by a controller, a command for a user interface of the device, wherein the command is associated with a card element displayed by the user interface, wherein the user interface and card element are displayed by the device and wherein operation of device for presentation of the user interface is based on a platform for operation with card elements. The method also includes determining, by the controller, at least one operation of the device based on the command and the platform for operation with the card element, wherein determining includes interoperation of the user interface with the platform and controlling, by the controller, operation of the device based on said determining.

In one embodiment, the command is a selection of a card element for access to content associated with the card element and presentation of the content by the user interface.

In one embodiment, the command is an exchange of the card element for exchange of at least one of content and capabilities of a card element relative to the device.

In one embodiment, the platform is an application platform for operation on the device and across a system to provide a common platform for one or more device types.

In one embodiment, the platform includes a discovery and pairing engine, a capability and matching engine, dynamic capacity engine and profiling engine.

In one embodiment, determining includes accessing entity information for one or more entities, capability information for the card element and card metadata.

In one embodiment, determining is based on a zone associated with the location of the device.

In one embodiment, controlling includes controlling exchange of a card element relative to the device and an entity of the application.

In one embodiment, controlling includes updating metadata for a card element.

In one embodiment, the user interface is associated with an application configured to operation across a plurality of devices based on the platform.

Another embodiment is directed to a device including a display a controller configured to control presentation of a card element for a user interface of a device. The controller is configured to detect a command for a user interface of the device, wherein the command is associated with a card element displayed by the user interface, wherein the user interface and card element are displayed by the device and wherein operation of device for presentation of the user interface is based on a platform for operation with card elements. The controller is also configured to determine at least one operation of the device based on the command and the platform for operation with the card element, wherein determining includes interoperation of the user interface with the platform and control operation of the device based on said determining.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein:

FIGS. 2A-2B processes for assigning card elements of an application user interface to a device according to one or more embodiments;

FIG. 5A-5C depict exemplary features of card elements according to one or more embodiments;

DETAILED DESCRIPTION OF THE EXEMPLARY EMBODIMENTS

Overview and Terminology

Figure 1A:
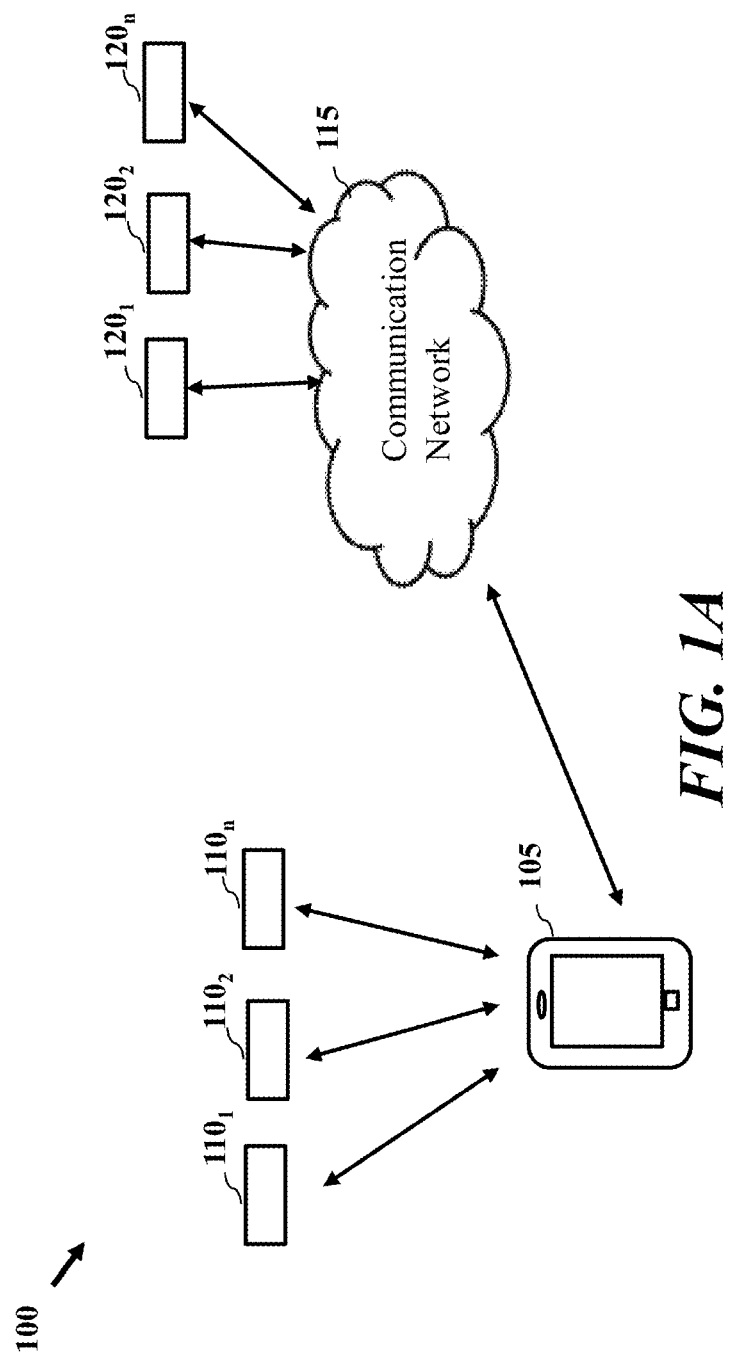
FIG. 1A depicts a graphical representation of a simplified system diagram according to one or more embodiments.

One aspect of the disclosure is to provide methods and devices for card interaction and assigning cards to devices. In one embodiment, a mobile operating system/experience (MOX) application is provided for card interaction and assigning cards. In another embodiment, a device is disclosed for facilitating card interaction and assigning cards. In another embodiment, a system is provided for allowing card assignment to devices. Other embodiments are directed to presentation of a user interface and processes for method is disclosed for creating the cards for use in the MOX application.

One or more embodiments described herein are directed to communication with devices and interoperability of devices by way of an application configured to execute on the one or more devices. The application, which may be a MOX application, may be configured to present a user interface with graphical elements to represent entities (e.g., devices, spaces, etc.) and card elements. The user interface may also be configured to allow for manipulation of the card elements, such that assignment of a card to a device within the user interfaces results in an association of a card element to the device within the application. In that fashion, representations in the user interface can result in associations of data by devices running the application (e.g., MOX application).

As used herein, a card can relate to graphical elements displayed in a user interface, wherein each card element can allow for one or more of exchange, communication, control and/or application accessibility. Card elements may be associated with one or more types of cards and one or more types of capabilities. A card element may have a data structure associated with each card type, the card providing metadata that can allow an application and/or devices to utilize the card. According to one embodiment, each card element can include a graphical element that is represented by a device and/or can include a data record stored by one or more servers or devices that allow for the card to be shared, transmitted, loaned, exchanged, associated, pulled and/or pushed to one or more devices and spaces. Card elements may define capabilities of devices and/or spaces. Card elements may be associated with devices or spaces that are real or virtual. Card elements may be uniquely identified.

As used herein, a MOX application relates to an application having particular core elements that allow for the application to be executed across many different devices and devices types. The application may be platform agnostic and thus, configurable on one or more operating systems or platform types (e.g., linux, etc.). The MOX application provides connectivity, control and/or communication relative to one or more devices. The MOX application can be operated based on communication with a network and/or peer-to-peer communication among devices. The MOX application may operate within a network or system that is an ecosystem or MOX ecosystem. The MOX application may be deployed on one or more devices, entities or spaces that make up a MOX ecosystem.

According to one embodiment, the MOX system is an application that runs on a mobile device. According to another embodiment, MOX provides a unique user interface with many features. Features of the MOX application can be characterized as user interface (e.g., user experience) features and architectural features. The MOX system incorporates cards. Cards are displayed as visual elements in the user interface that can be manipulated to provide exchange of data, capabilities, and allow for device control. Card elements may be configured as containers.

As used herein, an entity relates to elements that that are recognized and that make up an ecosystem of the application. An entity may relate to a device, space, and users of an application. An ecosystem relates to collections of entities that are associated.

Spaces relate to real and virtual locations that are recognized by the application. By way of example, a space may be assigned to one or more of a room, building, floor, home, office or other physical location (e.g., café, office, etc.). Spaces may also be assigned to virtual locations that do not have a corresponding physical location.

A device can relate to devices configured to execute and run a MOX application. A device can also relate to non-MOX devices. Devices may refer to real and virtual devices.

Architectural aspects of the MOX application relate to the card configuration, platform for operating with mobile device OS, and underlying processes for card exchange functionality.

One embodiment is directed to processes for presentation of a user interface and a device configured to present a user interface, such as MOX, with cards.

Another embodiment is directed to an application platform, processes and devices for operating within a MOX platform. MOX may provide a common UI for multiplatform devices, such as a single unified way to control or know even though devices are not connected. The MOX architecture may include one or more of the following attributes: use of cards as containers, defined card architecture, card based metadata (Json Metadata). MOX may allow for spaces and provide a visual of all spaces based on connection. MOX may include a prioritization algorithm based on proximity, known/history, places with access, etc. MOX may allow for a search of virtual spaces. MOX may be configured with a MOX stack and MOX plugin, and security features. MOX may allow the same card to provide different actions on different devices. MOX may be configured to publish a card into any device (virtual or real).

MOX may operate based on independently defined APIs, which are available via a RESTful interface (similar to the cloud interface). The APIs may be defined by an OEM to support the device.

In certain embodiments, a MOX card itself is an HTML object, containing relevant resources related to color pallet, and branding, as well as the interactive components. Both the front and the back of the card are supplied by the device itself, and are validated by the cloud.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

Referring now to the figures, FIG. 1A depicts a graphical representation of a simplified system diagram according to one or more embodiments. System 100 may be configured for presentation of an application by device 105. By way of example, system 100 includes one or more devices that may be configured with similar core elements to allow for an application to reside on one or more devices for connectivity, communication, exchange and/or control relative to the devices. Based on the application, device 105 may communicate and interoperate with one or more other devices, such as devices $110_{1-n}$. According to another embodiment, device 105 may communicate and interoperate with one or more other devices, such as devices $120_{1-n}$ by way of a communication network 115. System 100 may be configured to allow for control and communication by device 105 with one or more of devices $110_{1-n}$.

Device 105 may be configured to execute an application, such as a MOX application providing one or more functions, including but not limited to viewing of cards associated with the user device, viewing other devices and cards associated with other devices, exchange of cards between the user device-exchange may be based on one or more of push/fling, pull and exchange of cards and contextual presentation of cards. The user interface may be configured to detect user commands of device 105 for assignment of cards to another device, such as devices $110_{1-n}$ and/or $120_{1-n}$.

According to one embodiment, device 105 is configured to run an application (e.g., a MOX application) configured to present a user interface. Device 105 includes memory and hardware configured to store and execute an application, such as a MOX application and to operate with one or more card elements. The MOX application may run across multiple devices of system 100, including multiple device types and across multiple device operating platforms.

According to one embodiment, devices $110_{1-n}$ relate to one or more devices in close proximity to device 105. Device 105 may be configured to communicate wirelessly with the devices $110_{1-n}$ by way of the MOX application. Devices $110_{1-n}$ relate to devices associated with a particular space and/or ecosystem. Accordingly, a user interface may identify and/or include graphical elements for devices $110_{1-n}$ and for card elements of devices $110_{1-n}$. Devices $120_{1-n}$ relate to devices which may be communicated with over communication network 115 via the user interface of the MOX application. Devices $120_{1-n}$ may relate to devices in close proximity or distances from device 105. Devices $120_{1-n}$ may relate to electronic devices. In some embodiments, devices $120_{1-n}$ include one or more servers.

Device 105 may run a MOX application that allows for detection of user input/touch commands of a graphical element and movement from one section of the display to another section where the graphical element is a card element, and how the system processes the movement (exchange, interact, control, etc.). Movement of cards within the user interface call allow for assignment of a card to a device.

The MOX application can allow for one or more of card presentation, association of cards and entities (e.g., devices, virtual devices), transition of card and/or entities with respect to user actions or spaces, display of cards based on capability matching, selection of which cards to display, user and device avatars, a summary view and detailed view of card, and card comments.

Device 105 may present/provide a user interface and MOX application to allow for hanging cards on devices, controlling devices using cards, borrowing services (e.g., Wi-Fi) using cards, capability sharing (e.g., sharing control of a device), and one or more features built around sharing cards. Device 105 may detect user input/touch commands of a graphical element and movement from one section of the display to another section where the graphical element is a card element. The MOX application processes movement of cards (exchange, interact, control, etc.).

Device 105 includes a display configured to present a user interface and a controller coupled to the display. The controller is configured to present a user interface. An exemplary representation of a user interface is depicted in FIG. 3 according to one or more embodiments. The user interface is presented including graphical elements for one or more card elements, graphical elements for one or more spaces and devices, such as devices $110_{1-n}$ and devices $120_{1-n}$.

Architectural aspects of the MOX application can include providing card configurations, providing a platform for operating with mobile device operating systems (OS), and underlying processes for card exchange functionality within the MOX application.

Device 105 may be a mobile device or tablet executing an application, such as the MOX application executed by device 105. Although FIG. 1 depicts one device 105, it should be appreciated that system 100 and the application may allow for multiple devices to communicate and interoperate.

System 100 may include a server, wherein one or more of devices 120$_{1-n}$ may relate to servers. Device 105 may be configured to communicate with the server of system 100. The device is configured to present a user interface including graphical elements for one or more card elements, detect a user interface command to associate a selected card element presented by the user interface with a selected space presented by the user interface, and output a communication to the server including an association of the selected card element with the selected space, wherein the association of the selected card with the selected space includes updating metadata for the card element.

According to one embodiment, system 100 may be configured to provide a card store. The card store may allow for device 105 to purchase card elements by way of an application, such as a MOX application. According to another embodiment, one or more of devices 120$_{1-n}$ may provide card elements for sale to a device 105. In that fashion, card elements that are for sale and/or card components may be displayed by a user interface presented by device 105 to allow for browsing, purchasing and exchange of card elements for sale. In one embodiment, a MOX application may provide a card publishing system. The operation may include one or more of generation of a card by an OEM, generation of cards by Retailers (e.g., advertising, promotions, etc.), analytics and data mining, intelligent cards, and behavior tracking. In one embodiment, MOX may provide contextual advertising including one or more of processes, systems and devices for advertising within MOX UI. Contextual ads may be presented based on MOX devices, locations, etc. with the ability to pull ads, promotions and content.

Figure 1B:
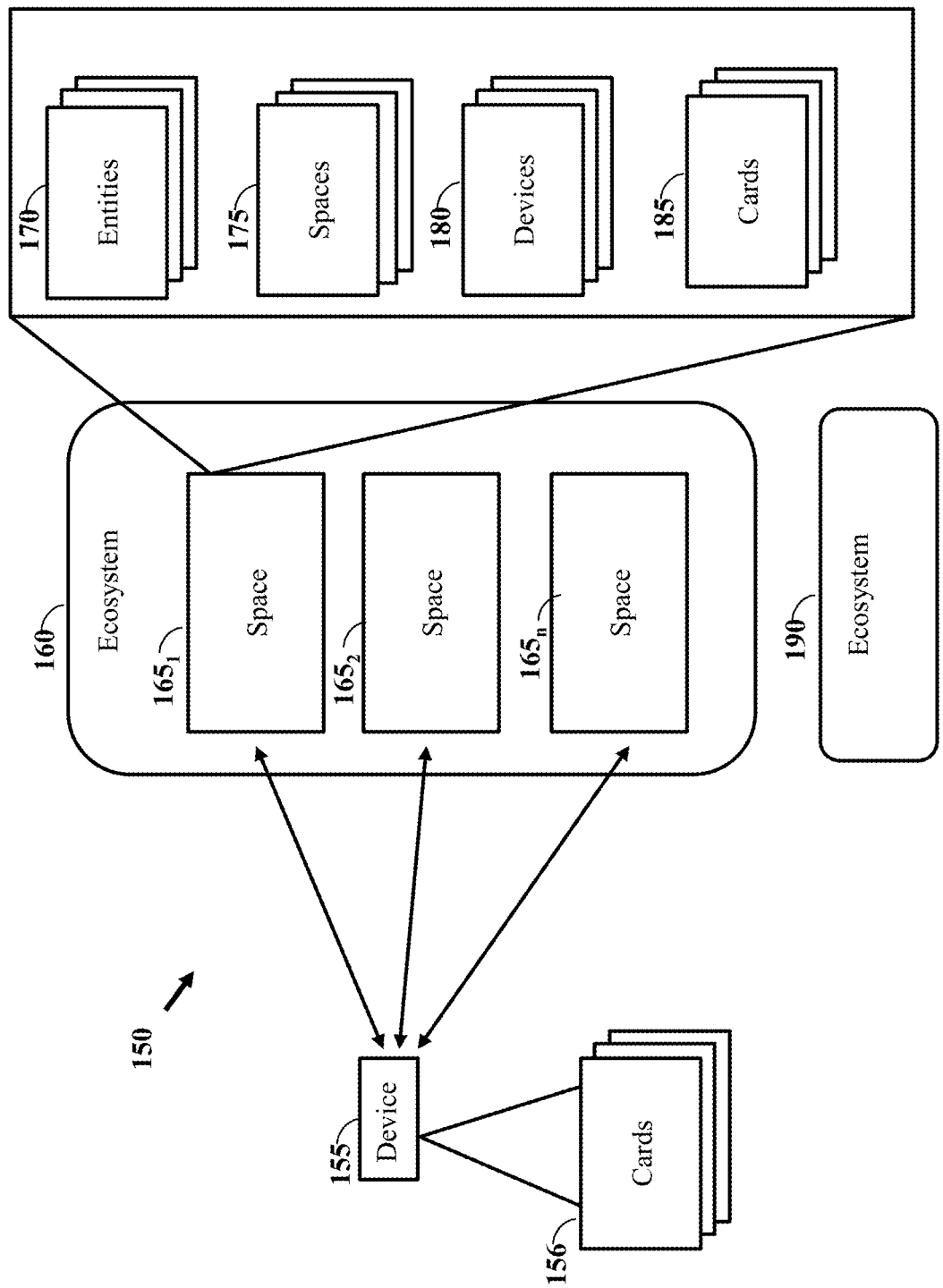
FIG. 1B depicts a graphical representation of system entities according to one or more embodiments.

FIG. 1B depicts a graphical representation of system entities according to one or more embodiments. According to one or more embodiments, an application or electronic platform is provided for communication, control and exchange based on one or more associations. FIG. 1B depicts a graphical representation of application entities for a MOX application system. A MOX system 150 can include a plurality of devices, such as device 155. System 150 depicts an exemplary representation of entities that can make up ecosystem of the application with respect to device 155. Device 155 may relate to a representation of device 105 of FIG. 1A.

Each device in system 150 can be associated with one or more ecosystems. Device 155 is associated with ecosystem 160. Within a MOX system, each device may be associated with different ecosystems. Ecosystems may be particular to a particular device or user. Ecosystem includes a plurality of spaces 165$_{1-n}$. According to one embodiment, each of spaces 165$_{1-n}$ may be associated with device 155 by user selection, location of device 155 and/or by system 150. A user interface of device 150 may display graphical elements associated with one or more of spaces 165$_{1-n}$ based on the location and/or operation of the device. Spaces 165$_{1-n}$ may be real or virtual locations. By way of example, spaces 165$_{1-n}$ may be assigned to one or more of a room, building, floor, home, office or other physical location (e.g., café, office, etc.).

Spaces 165$_{1-n}$ may also be assigned to virtual locations that do not have a corresponding physical location. Each of spaces 165$_{1-n}$ may be associated with one or more devices, such as device 155 for a user. Based the selection of a space or location of device 155, the user interface may present one or graphical elements for each space. In addition, device 155 may be configured to assign one or more cards to a device.

Card elements 156 are HTML objects, containing relevant resources related to color pallet, and branding, as well as the interactive components. Both the front and the back of the card are supplied by the device itself, and are validated by the cloud.

Each of spaces 165$_{1-n}$ may include and/or be associated with a plurality of entities 170, spaces 175, devices 180, and cards 185. Entities 170 associated with a space, such as space 165$_1$, can include MOX and non-MOX enabled devices, users, etc. Spaces 175 associated with a space, such as space 165$_1$, can include one or more spaces associated based on location, card selection, user preferences/selections, etc. Devices 180 associated with a space, such as space 165$_1$, can include MOX and non-MOX enabled devices, devices based on location, device assigned to a space etc. Cards 185 associated with a space, such as space 165$_1$, can include one or more card elements associated by a user to a space, such as cards 156 or cards that may be available while within a space.

Ecosystem 190 may be another ecosystem that is not assigned to device 155. Device 155 may be configured to join or gain access to ecosystem 190 using a MOX application.

FIGS. 2A-2B depict processes for assigning card elements of an application user interface to a device according to one or more embodiments. FIG. 2A depicts process 200 for presentation of a user interface according to one or more embodiments. Process 200 may be employed to assigning card elements of an application user interface to a device or devices. Process 200 may be performed by a device such as device 105 of FIG. 1A. Process 200 may be configured to present a user interface at block 205. The user interface presented at block 205 may be associated with a MOX application. The user interface may be presented at block 205 including graphical elements for one or more card elements, graphical elements for one or more spaces, and graphical elements for one or more devices. In one embodiment, the user interface includes graphical elements for one or more devices in one portion of the user interface and the graphical elements for one or more card elements in a second portion of the user interface. For example, the devices may be icons or graphical elements presented in a top portion of the user interface. Each card element includes graphical display elements in the user interface configured to be manipulated within the user interface to allow for at least one of exchange of data, capabilities, and device control.

At block 210, an interface command is detected. The detected interface command may be to associate a selected card element presented by the user interface with a selected device presented by the user interface. In certain embodiments, the user interface command includes selection (e.g., tap, tactile, other, etc.) and movement of a graphical element for the selected card from a first position (e.g., the displayed position) in user interface to a second position associated with display of the selected device. The selected device may refer to physical or virtual locations.

At block 215, the application outputs a communication based on the detected interface command. According to one embodiment, outputting a communication includes the association of the selected card element with the selected device.

Based on the association of the selected card with the selected device, metadata for the card element may be updated. Association may include transmission of card element metadata to the device. In one embodiment, updating metadata includes storing a unique identifier of the device with the card element metadata.

In one embodiment, assignment of the selected card element to the selected device may be based on a determination that the card element can be assigned to the device. For example, the application can determine whether the assignment conforms to at least one of capabilities of the device and card element constraints. The card application may determine that a card element cannot be assigned to a device and in response may display one or more elements to indicate that the assignment cannot be made. Following the output communication at block 215, user interface can continue to display the selected card element in the user interface following assignment to the selected device.

In one embodiment, process allows for exchange of data associated with the card to be provided to a device. The MOX application may be configured to allow for the data to be usable by one or other MOX devices. In this fashion, conventional methods of electronically sending that require end user addresses (e.g., email) are not required. Similarly, assignment does not require configuration, downloading, decompressing, other steps for the card to be useable once assigned. Rather, card assignment allows for the card element to appear within the user interface when the device to which the card is assigned is selected. In addition, one or more properties of the card element may be usable by the device to which the card is assigned.

Operations associated with interface commands at block 210 can be associated with one or more operations within an application, such as a MOX application. Accordingly, operations determined at block 215 may be associated with one or more functions of features of an application, such as a MOX application.

In one embodiment, an operation determined at block 215 includes creating a custom card based on a file or document, such as an image file. In that fashion a custom card element may be created by a device for use with the application. The custom card element may be shared to with entities or zones of associated with the application. Content of a custom card may be edited within the MOX application. A user interface can allow for opening a card element, updating information and presentation of the card element, and include tracking access and sharing of the card element. By way of example, a card element created for a product, such as a particular wine, may be created to include an image captured for the product, text information describing the product, a tracking feature to track product use, and include comments for other users of the application to provide comments for the card element. Custom card elements may have additional functionality. In one embodiment, custom card elements may be created for a recipe, greetings cards (e.g., birthday card, etc.).

In one embodiment, an operation determined at block 215 includes purchasing a card element from a store. As such, the interface command at block 210 may relate to selection of a card element from a user interface display be a device.

In one embodiment, an operation determined at block 215 relates to operations following an input to a user interface. By way of example, the operation at block 215 may be to exchange a card element in response to a pull down command and/or a push command. Pull down commands may relate to pulling a card element to a device. Pull down commands may relate to pulling information from a card element associated with a location or point of interest to receive information (e.g., museum, commercial information, etc.). Push commands can push a card, such as a goodness card, to another MOX user's inbox. Another example, at block 215 may be exchange of contact information provided by card elements. In yet another embodiment, a discussion may be shared to a public space. Pull commands can remove, and/or copy, a card element from one device for access of the card element on another device.

In one embodiment, an operation determined at block 215 includes creating a tracker card, such as a card that can be associated or linked with tracking functionality for location, access times, views, etc. Tracker cards may be pushed to other users of the application, such as the MOX application, to share activity associated with a card element.

FIG. 2B depicts a process for operation of a device (e.g., device 105) according to one or more embodiments. Process 250 may be configured to run an application (e.g., a MOX application) to determine card elements for display at block 255. At block 260, the application presents a user interface with graphical card elements associated with a MOX application. At block 265, the application can detect assignment of a card to a device. Process 250 may continue with associate the card with the device at block 270. Process 250 may optionally include determining the capability matching of the card element and the device at block 270.

User Interface

Figure 3A:
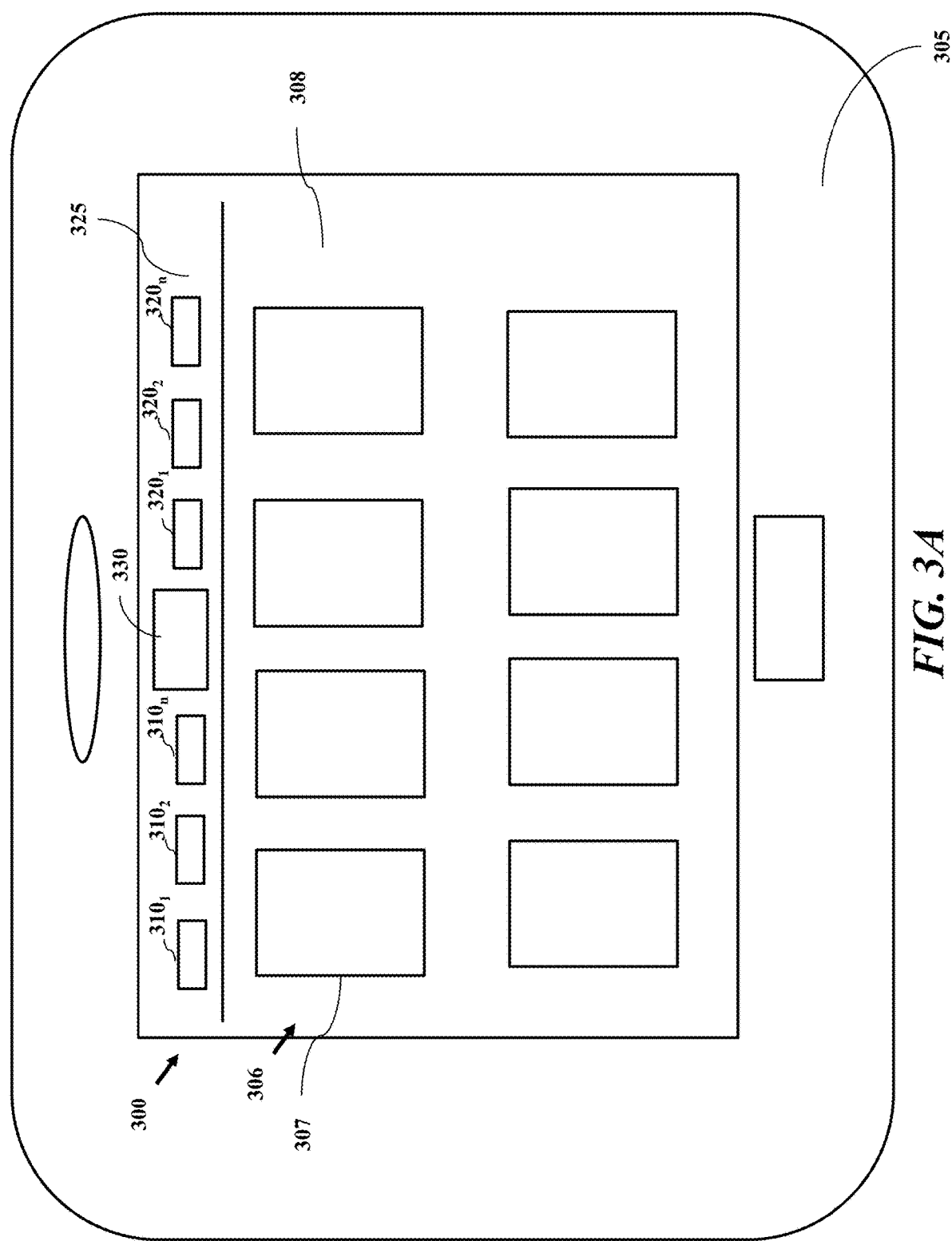
FIGS. 3A-3C depict a graphical representations of a user interface according to one or more embodiments.
Figure 3B:
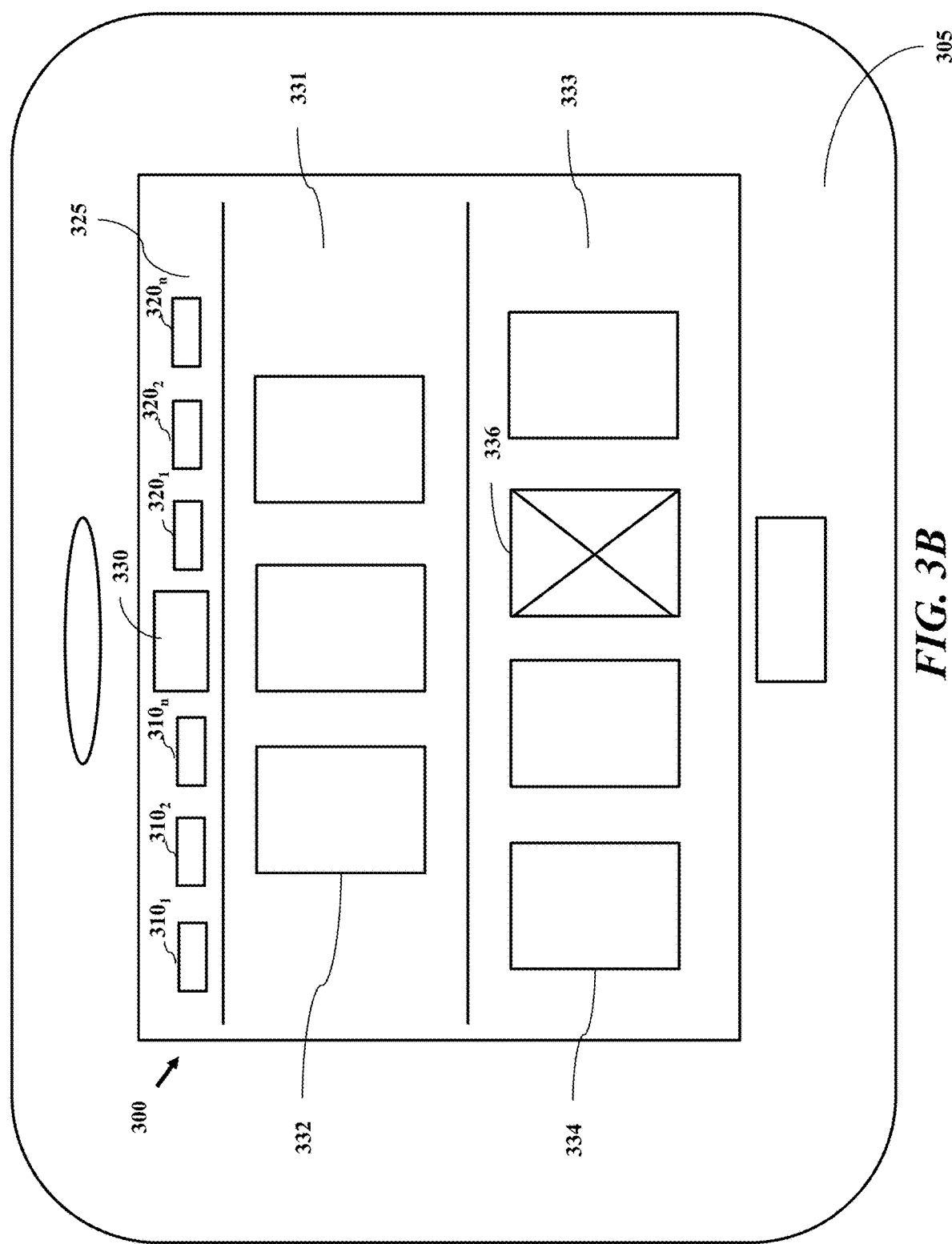

FIGS. 3A-3B depict graphical representations of a user interface according to one or more embodiments. The user interface may be displayed on a user device 305. The user device 305 can be a cellular phone, an electronic tablet, an e-reader, a laptop computer, or any other device with control capabilities and a connection to a communication network. The user interface 300 is presented including graphical elements for one or more card elements including graphical elements for one or more spaces. Features of user interface 300 allow for one or more of viewing of cards associated with the user device, viewing other devices and cards associated with other entities other devices, spaces), and exchange of cards between the user device and other devices. Exchange may be based on one or more of push/fling, pull and exchange of cards. The user interface also allows for contextual presentation of cards.

In one embodiment, user interface 300 may provide card interaction by way of an exchange view. A MOX application may provide processes and device for exchange of a card via a user interface (MOX). User interface features and processes for showing cards include a detailed view and summary view when selected, capability matching, communication of device features, devices indicating that services and capabilities are available, and associating content with any device so that content appears to reside on the device.

In one embodiment, MOX may provide card interact on including a push operation. The push operation may include one or more of a fling gesture of card, a profile card, settings card, cards in general, etc., hanging a card, capabilities (network access, temporary control of a device, guest features, etc.) capability matching, appearance of card transition.

In one embodiment, MOX may provide card interaction including a pull operation. The pull operation may include one or more of pulling a device card, borrowing capabilities, capability matching, pulling settings vs. pulling an app., pulling a card off of a device, appearance of card transition.

In one embodiment, MOX may provide card interaction including assigning/associating cards to devices (virtual or connected). The operation may include one or more of a device that is connected or not is presented in the MOX UI and connection to the device (whether virtual or actual) based on card, processes for identification based on scanning, and searching for non-connected and connected devices, associating devices connected or not with spaces), and creating a virtual equivalent.

In one embodiment, MOX may provide card interaction including assigning cards to Space/Card Hanging. The operation may include one or more of processes and device where a card may be assigned to a space, including acts for flinging, pushing or hanging card to a space, presentation of the card on other devices, presenting cards based on a space that a device is in, card presentation based on geolocation.

One embodiment is directed to detection of user input/touch commands of a graphical element and movement from one section of the display to another section where the graphical element is a card element. The MOX application processes movement of cards (exchange, interact, control, etc.). The application allows for description of card presentation, description of cards and entities (e.g., devices, virtual devices,) in user interface, transition of card and/or entities with respect to user actions or spaces, display of cards based on capability matching, selection of which cards to display, user and device avatars, design summary view and detailed view of card, and card comments.

User interface features allow the MOX application to provide functions including hanging cards on devices, controlling devices using cards, borrowing services (e.g., Wi-Fi) using cards, capability sharing (e.g., sharing control of a device), and one or more features built around sharing cards.

FIG. 3A depicts a graphical representation of a user interface configuration. According to one embodiment, a user interface 300 of the user device 305 may be presented for an application, such as a MOX application. FIG. 3A, depicts an exemplary representation of a home layout 306 for a plurality of card elements, such as card element 307. Home layout 306 may be displayed in display area 308 to allow for a presentation format of a particular number of card elements, such that card elements may be scrolled or navigated to within display area 308 based on input commands. According to one embodiment, home layout 306 may present card elements associated with the user of device 305. According to one embodiment, user interface may employ a gridded modular layout to allow for shifting pieces of content, such as card elements.

User interface 300 of the user device 305 includes a listing of a plurality of devices or spaces, shown as $310_1$, $310_2$, $310_n$, 330, $320_1$, $320_2$, and $320_n$ within an entity list 325 associated with a display area of user interface 300. Element 330 may relate to the device or entity selected. When home layout 306 is presented, element 330 may relate to device 305. In this embodiment, there is no limit to the number of entities in the entity list 325. Some of the entities $310_1$, $310_2$, $310_n$, are connected directly with the user device 305. Some of entities $320_1$, $320_2$, and $320_n$, can be connected to the user device 305 by a communication network. The communication network can be a local network or a more global network, such as the Internet.

According to one embodiment, home layout 306 is presented in response to one or more user interface or device commands, such as a universal gesture or button press. According to one embodiment, presentation of home layout 306 includes a transition from the previous display (e.g., desktop) to home layout 306. Once activated, user interface 300 can include one or more graphical elements associated device 305. According to another embodiment, a home layout, such as home layout 306, may be presented associated with another device to provide a display and/or listing of other devices or card elements accessible to device 305. According to one embodiment, home layout 306 is presented as a MOX notebook as a collection of card elements that are frequently accessed. The MOX application associated with user interface 300 may be configured to capture a collection of user interests, cards shared, cards retained and frequently accessed card elements to provide easy access.

According to one embodiment, capabilities of device 305 with respect to other devices and shareable content may be presented in user interface 300. Capabilities of selected devices and remote control features can also be provided in user interface 300. User interface 300 may be presented on a tablet, mobile device etc. When device 305 relates to a tablet, the size, rows and number of elements 307 may be configured based on the tablet display. When device 305 relates to a mobile device, or devices with smaller screen (e.g., mobile phones, etc.), presentation of user interface 300 can include a similar format as the tablet presentation, however, the number of card elements 307 presented at one time may be reduced. User interface 300 may support cards of many different sizes, including but not limited to a mini card, normal/standard card presentation size, large (e.g., increased size) and pop-up card configurations.

According to one embodiment, several actions can be performed in user interface 300, including push, pull, borrow/loan, control, etc.

In FIG. 3B, user interface 300 of the user device 305 has a number of individual features, such as a user row 333 and a device row 331. The user interface also presents an entity list 325. The entity list includes a listing of a plurality of devices or spaces, shown as $310_1$, $310_2$, $310_n$, 330, $320_1$, $320_2$, and $320_n$. In this embodiment, there is no limit to the number of entities in the entity list 325. Some of the entities $310_1$, $310_2$, $310_n$, are connected directly with the user device 305. Some of the entities $320_1$, $320_2$, and $320_k$, are connected to the user device 305 by a communication network. The communication network can be a local network or a more global network, such as the Internet.

The user interface of the user device 305 also presents a plurality of user card elements 334 which are stored on the user row 333. These user card elements 334 are associated with the user device 305. Likewise, the user interface of the user device 305 presents a plurality of device card elements 332 which are stored on the device row 331. These device card elements 332 are associated with a selected third-party device 330. The selected third-party device is one of the plurality of third-party devices which are listed on the entity list 325. The user has the ability to select any third-party device, $310_1$, $310_2$, $310_n$, 330, $320_1$, $320_2$, and $320_n$, and upon selection, the user's choice will become the selected third-party device 330. Once the user has made a choice for the selected third-party device 330, the device row 331 will automatically update such that the device row 331 displays the plurality of device card elements 332 associated with the selected third-party device 330.

According to one embodiment, user interface 300 is presented including graphical elements 334 for one or more card elements in a first portion (e.g., row 333) and graphical elements for one or more devices $310_{1-n}$ and $320_{1-n}$. User inputs (e.g., contact, touch, selection, etc.) may be detected by device 305 as a user interface command to associate a selected card element presented by the user interface with a selected device presented by the user interface 300. FIG. 3B depicts a selected card 336 in a first portion of the user interface. In certain embodiments, the user selection may be a tap, hold and drag to a second portion of the user interface, such as device row 331. The second portion of the user interface may also relate to a tap, hold, and drag to a device (e.g., one or more devices $310_{1-n}$ and $320_{1-n}$). Following the assignment of the card to a device, user interface 300 may update the presentation format.

Figure 3C:
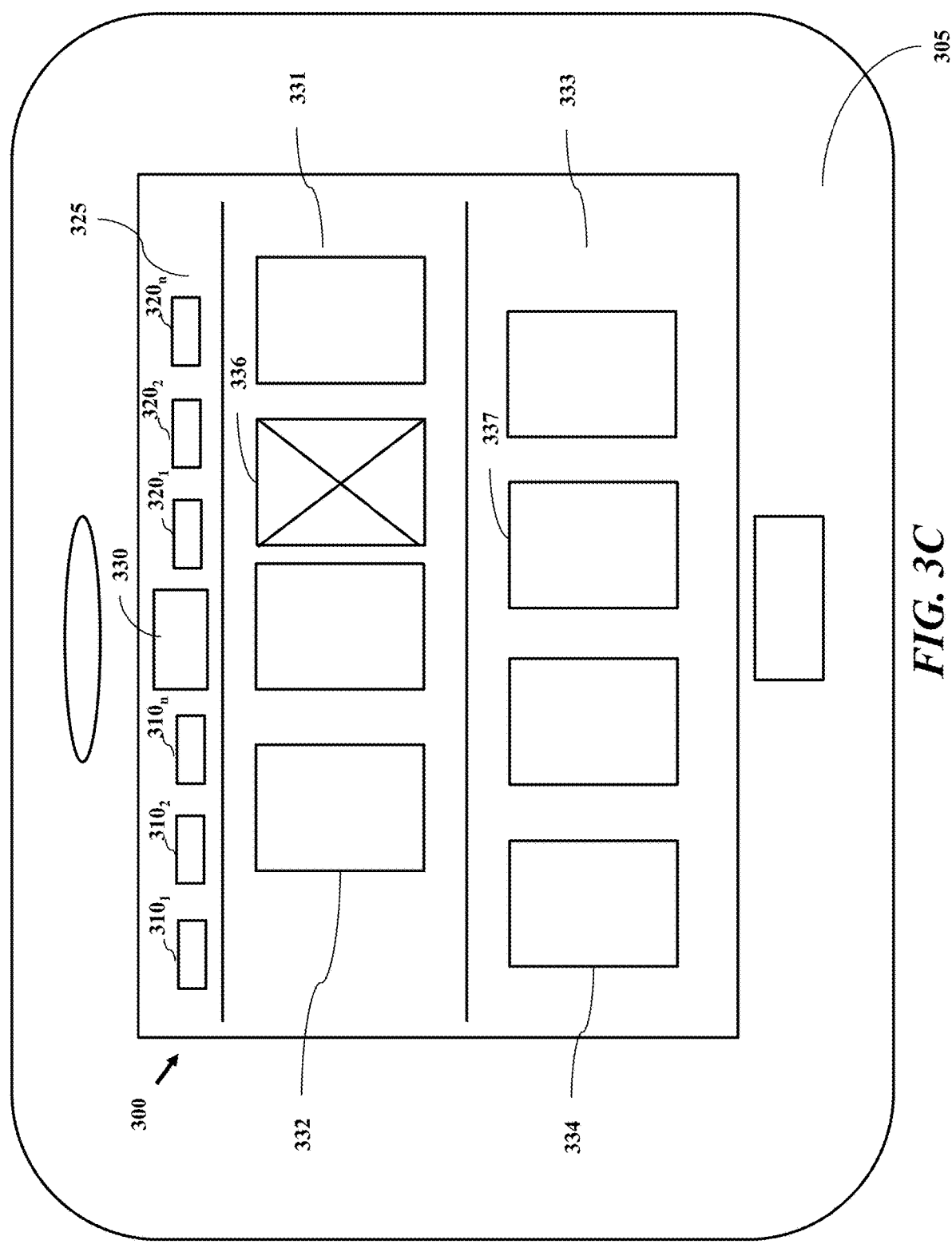

FIG. 3C depicts a selected card 336 in a portion of the user interface following card assignment to a device according to an exemplary embodiment. According to one embodiment, selected card element may be assigned to another device, and thus, the application will present a graphical element for the selected card element 336 in row 331. In certain embodiments, assignment of a card element to a device copies the card element to the device, such that a graphical element, such as 337, is still provided in row 333 of the user interface. In other embodiments, assignment of for the selected card element 336 will transfer the selected card element to the device for which graphical elements in row 331 are presented. In such a case, user interface will present graphical element 337 in row 333 which relates to a different card element from selected card element 336. Device 305 may output a communication including an association of the selected card element 336 with the selected device, wherein the association of the selected card with the selected device includes updating metadata for the card element.

Figure 4A:
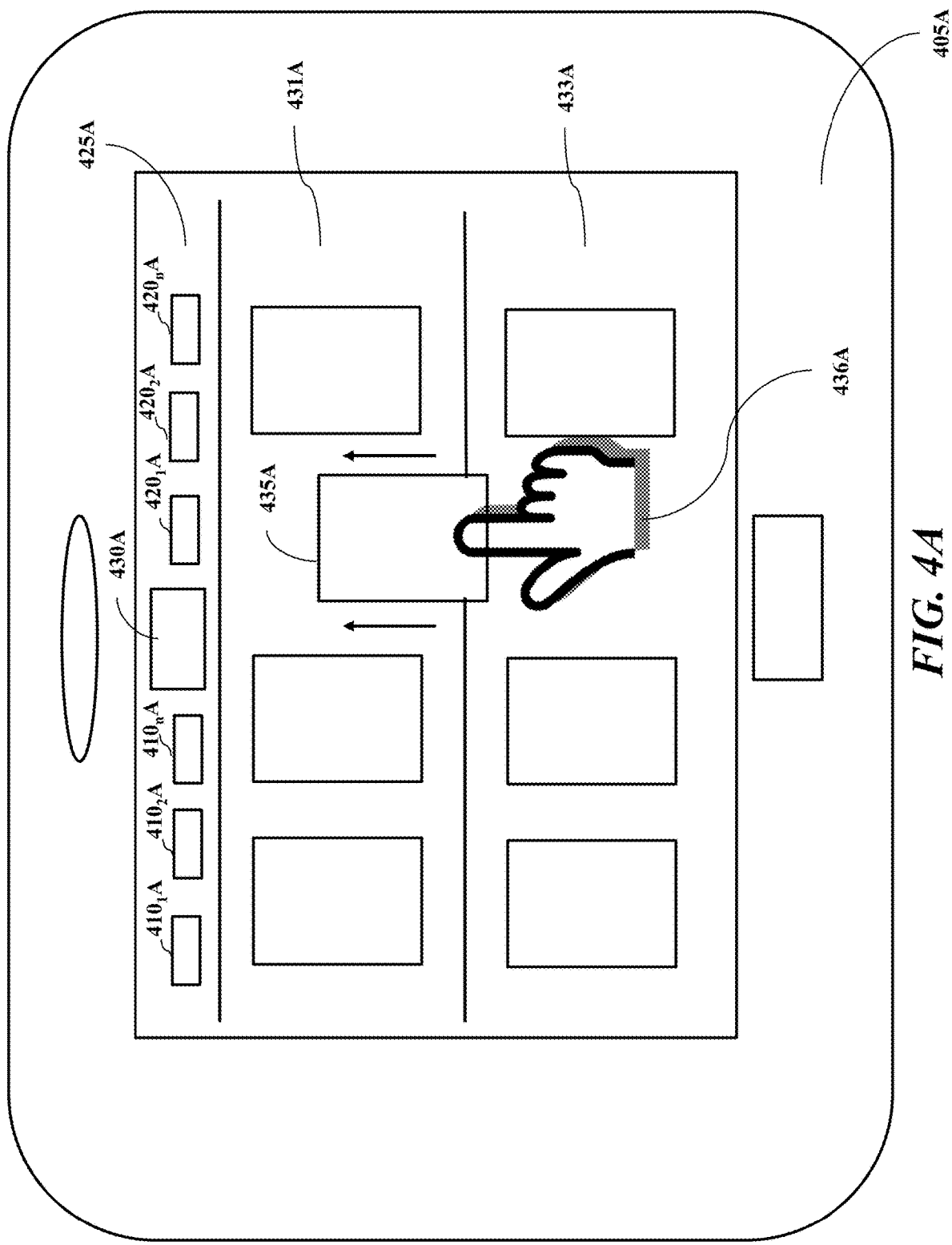
FIG. 4A depicts a graphical representation of card interaction within a user interface according to one or more embodiments.

FIG. 4A depicts a graphical representation of card interaction within a user interface according to one or more embodiments. The user interface is displayed on the user device 405A. The user interface presents a user row 433A and a device row 431A. The user interface also presents an entity list 425A. The entity list includes a listing of a plurality of devices/spaces $410_1$A, $410_2$A, $410_n$A, 430A, $420_1$A, $420_2$A, and $420_n$A. In this embodiment, there is no limit to the number of entities in the entity list 425A. Some of the entities $410_1$A, $410_2$A, $410_n$A, are connected directly with the user device 405A. Some of the entities $420_1$A, $420_2$A, and $420_n$A, are connected to the user device 405A by a communication network. The communication network can be a local network or a more global network, such as the Internet.

The user has the ability to select any entity $410_1$A, $410_2$A, $410_n$A, 430A, $420_1$A, $420_2$A, and $420_n$A, and upon selection, the user's choice will become the selected entity 430A. Once the user has made a choice for the entity 430A, the device row 431A will automatically update such that the device row 431A displays the plurality of card elements associated with the selected entity 430A.

The user device 405A allows for the user to send a selected card element 435A from the user row 433A to the entity 431A. The user does this through a tactile motion 436A. The tactile motion 436A can be one continuous swipe, flick, fling, or similar gesture. Alternatively, the tactile motion 436A can be a plurality of tapping motions.

Figure 4B:
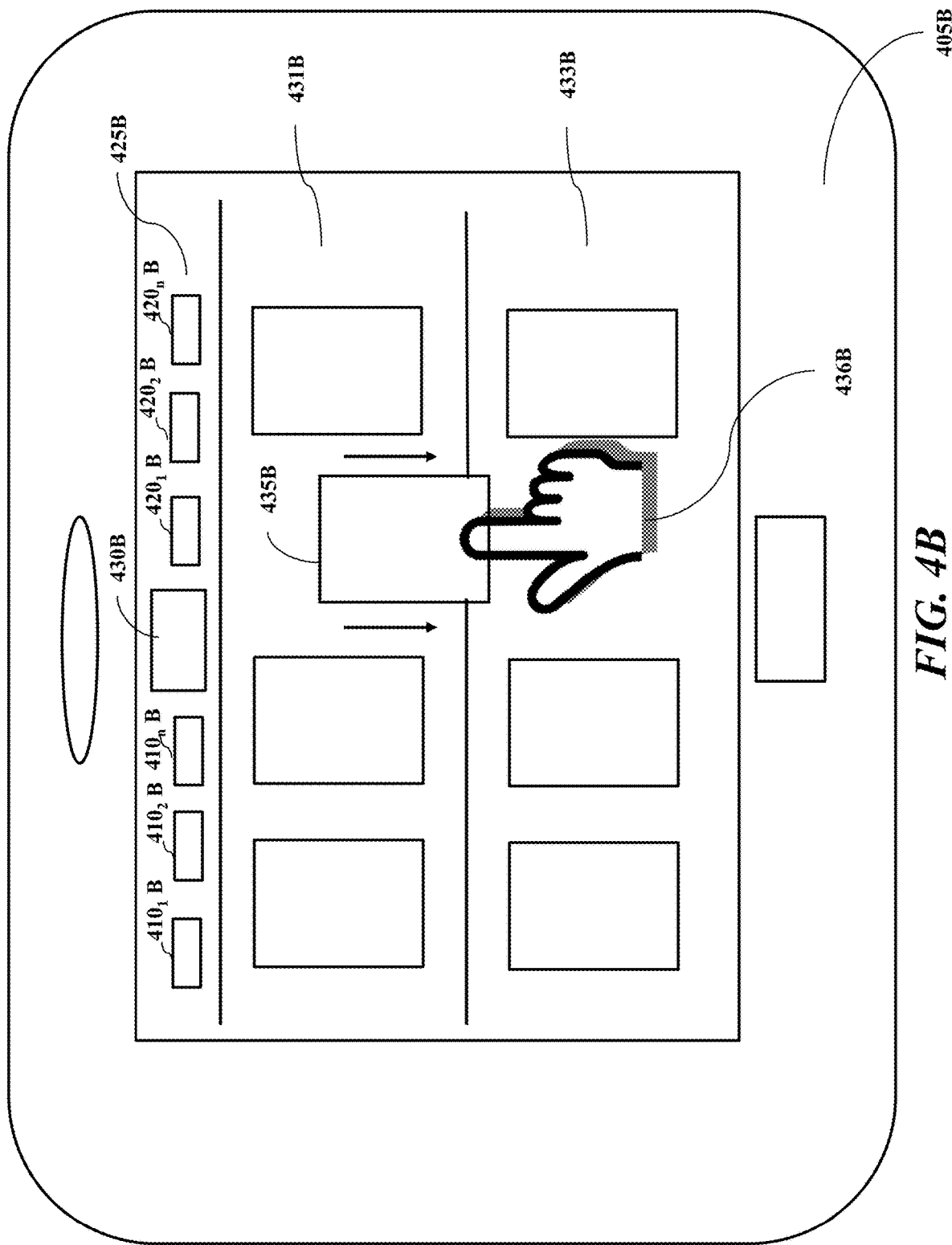
FIG. 4B depicts card interaction within the secondary user interface according to one or more embodiments.

FIG. 4B depicts card interaction within the secondary user interface according to one or more embodiments. The secondary user interface is displayed on the secondary user device 405B. The secondary user interface presents a user row 433B and a device row 431B. The secondary user interface also presents an entity list 42511. The entity list includes a listing of a plurality of entities $410_1$B, $410_2$B, $410_n$B, 430B, $420_1$B, $420_2$B, and $420_n$B. In this embodiment, there is no limit to the number of entities listed in the entity list 425B. Some of the entities $410_1$B, $410_2$B, $410_n$B, are connected directly with the secondary user device 405B. Some of the entities $420_1$B, $420_2$B, and $420_n$B, are connected to the secondary user device 405B by a communication network. The communication network can be a local network or a more global network, such as the Internet.

The secondary user has the ability to select any entity $410_1$B, $410_2$B, $410_n$B, 430B, $420_1$B, $420_2$B, and $420_n$B, and upon selection, the secondary user's choice will become the selected third-party device 430B. Once the user has made a choice for the selected third-party device 430B, the device row 431B will automatically update such that the device row 431B displays the plurality of device card elements associated with the selected third-party device 430B.

The secondary user device 405B allows for the secondary user to receive a selected card element 435B from the device row 431B to the user row 433B. The user does this through a tactile motion 436B. The tactile motion 436B can be one continuous swipe, flick, fling, or similar gesture. Alternatively, the tactile motion 436B can be a plurality of tapping motions.

Referring to FIGS. 4A and 4B, and as previously discussed, a user on a user device 405A can send a selected card element 435A from the user row 433A to the device row 431A. The device row 431A displays the device card elements associated with the selected third-party device 430A. By sending the selected card element 435A to the device row 431A, the selected card element 435A becomes associated with the selected third-party device 430A. When a secondary user on a secondary user device 405B chooses a selected third-party device 430B from the entity list 425B, that secondary user is able to see all the device card elements associated with the selected third-party device 430A. These device card elements are displayed on the device row 431B of the secondary user device 405B.

Therefore, if a user has sent a selected card element 435A to the device row 431A of a selected third-party device 430A, and the secondary user has selected the same third-party device 430B, such that 430A and 430B are the same third-party device, the secondary user is able to send the selected card element 435B from the device row 431B to the user row 433B, (where 435A and 435B are the same selected card element), such that the secondary user is able to view the selected card element 435A/435B on the user row 433B of the secondary user device 405B. 435 can be handing a card to a device or space. For example, can push as card to an appliance such as a refrigerator, may be a shopping list, so that other can view, update FIGS. 5A-5C depict graphical representations of interaction with a card element according to one or more embodiments. In one embodiment, an application displaying card elements may be configured to detect user input commands (e.g., touch, selection, manipulation, etc.) relative to one or more card elements displayed in a user interface.

According to one embodiment, card layout and elements may be uniform across devices running the application, such as a MOX application. In that fashion, a particular card may be presented with the same appearance across two different devices. According to embodiment, card elements in the application may be based on a card chronic, or layout. The card chrome may relate to a rectangular display element including a graphical element and description as will be described in more detail below with respect to FIG. 9. FIGS. 5A-5C depict exemplary features of card elements.

FIG. 5A depicts a representation of a card element 500 that may be displayed in a user interface. Card element 500 includes image 505. According to one embodiment, card element 500 may be an image type card. It should be appreciated that features of card element 500 may apply to other card. Card element 500 includes text box 510 including icon 515 and text 520. Text box 510 may include a message or description of image 505 received from the author/creator of the image 505. Icon 510 may be presented to identify the status of card element 500 such as shared or private. In certain embodiments, icon 510 may include an avatar or image associated with the author/creator of the image 505. When card element 500 is displayed in a user interface, a user may select and/or interact with the card element. According to one embodiment, interaction may include a slide command, shown as 525. The slide command may be detected by a device presenting the user interface to reveal display of a card element with one or more additional features of the application, such as card element representation 530 in FIG. 5B. Slide command 525 may relate to contact in a display area associated with card element 500 and motion in a particular direction which contact is maintained or substantially maintained. Although a slide command 525 is depicted in FIG. 5A, it should be appreciated that other types of commands may similarly be employed.

According to one embodiment, slide command 525 may be employed as a flipping command, wherein a different presentation of card element 500 may be provided by the user interface. For example, a user interface may present card element 500 and in response to an input associated with card element 500, present a detailed view of card element card element 500. The detailed view may be a graphical overlay including additional card elements and may include an enlarged presentation area for the card element.

FIG. 5B depicts a representation of a card element 530 which can correspond to card element 500 after a slide command 525 is detected. Card element 530 can relate to another display presentation for card element 500. Card element 530 includes image 505, text box 510, and menu 535. According to one embodiment, card element 530 may include representation of image 505 with a reduced sized to include presentation of menu 535 and retain the total size of a card element in the user interface. In other embodiment, menu 535 may extend out form the display area of card element 530. Menu 535 may be presented by the user interface in response to a user input, such as slide command 525, to include presentation of one or more graphical elements associated with functions available for card element 530.

Menu 535 includes multiple elements. According to one embodiment, elements in menu 535 may be selectable or not selectable based on one or more of capability of the card element and applicability of a feature. By way of example, star feature 540 represents a flag or like operation to signify approval, mark, and/or flag card element 530 and in particular image 505. Element 545 relates to wireless/device settings and element 550 can relate to sharing of an image (e.g., private/accessible, etc.). Elements 545 and 550 may be displayed in an unselectable manner if or when the features are not compatible or available for card element 530. Element 555 may represent that the card element 530 and/or card image 505 is locked for editing, deletion, etc. According to one embodiment, selection of menu 535 can allow for the presentation of card element 530 to be updated.

FIG. 5C depicts a representation of a card element 560 which can correspond to card element 560 after selection of an element from menu 535. Card element 530 can relate to another display presentation for card element 500. Card element 530 includes image 505, text box 510, and star feature 540. According to one embodiment, star feature 565 is presented with card element 560 based on detection of a user interface command for star feature 540. In other embodiment, star feature 565 may displayed when card element 560 is displayed on a device, such as a first device, or viewed on another device (e.g., a device configured to access card elements associated with the first device). Association of star feature 565 with card element 560, and/or image 505, may be presented by updating metadata of card element 500. Presentation of star feature 565 can relate to an example of user interaction with a card element and card modification. According to one embodiment, presentation of card elements may include anchoring information and symbols to the corners of card element 560, such as star feature 565.

Figure 6:
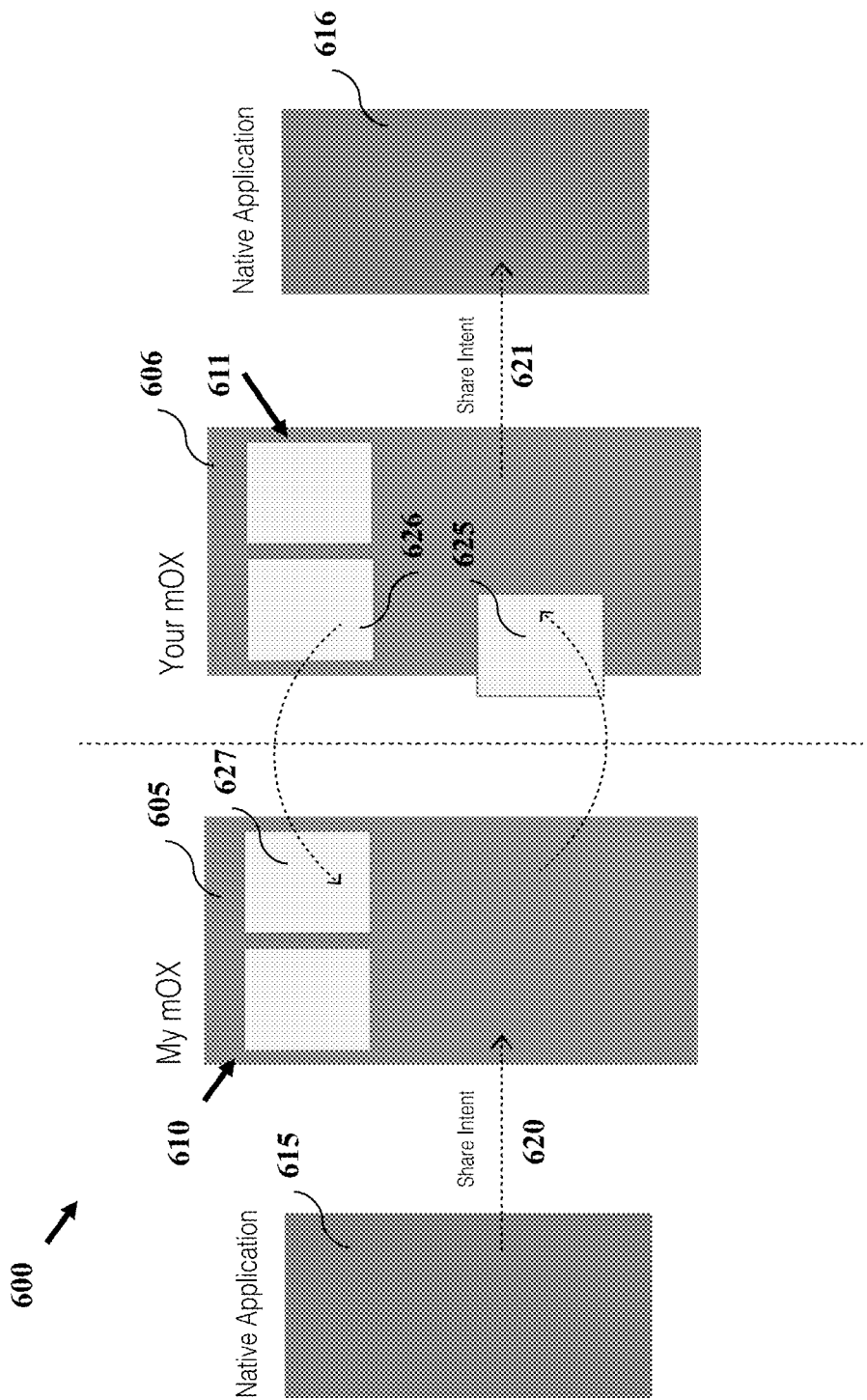
FIG. 6 depicts a graphical representation of exchanging card elements according to one or more embodiments.

FIG. 6 depicts a graphical representation of exchanging card elements according to one or more embodiments. According to one embodiment, entities may exchange card elements. Exchange may also relate to exchange of a card element relative to one or more devices. Exchange can include single direction transition and bi-directional exchange. Accordingly, a system 600 can include entity 605 and entity 606, wherein entity 605 and entity 606 may each relate to an instance or profile for execution of an application, such as a MOX application. As depicted in FIG. 6, entity 605 and entity 606 may relate to different user entities and/or different devices. Entity 605 may be associated with a plurality of card elements 610. Similarly, entity 606 may be associated with a plurality of card elements 611.

Entity 605 and entity 606 may each be associated with a native application, represented as native application 615 and native application 616. By way of example, native application 615 may be executed on a device to present an application, such as a MOX application, for entity 605. Based on an input command detected by a native application (e.g., touch, button press, etc.) a share intent 620 may be determined for a card element of entity 605 to be exchanged with entity 606. FIG. 6 depicts exchange of card element 625 from entity 605 to entity 606. Exchange of card element 625 represents transmission or passing of card element 625 to entity 606. According to another embodiment, share intent 620 of card element 625 can result in access of card element 625, as shown by share intent 621, by native application 616. FIG. 6 also depicts copying of card element 626 from entity 606 to generate card element 627 of entity 605. In that fashion, exchange relative to the entities includes duplication of card features and data to a new card.

Figure 7:
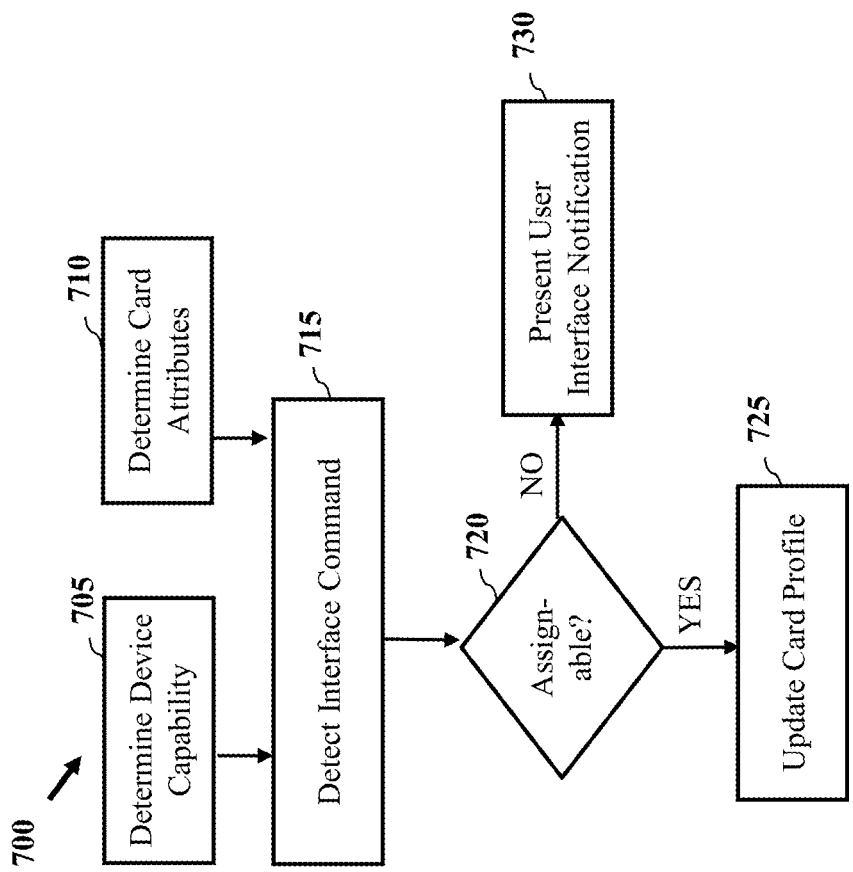
FIG. 7 depicts a process for card assignment to a device according to one or more embodiments.

FIG. 7 depicts a process for card assignment to a device according to one or more embodiments. Process 700 may be employed by a device (e.g., device 105, device 155, etc.) according to one or more embodiments. Process 700 is associated with operations executed by a device and performed by an application, such as a MOX application, run by the device for displaying the user interface and interaction with one or more other devices. According to one embodiment, process 700 includes determining device capability at block 705 and determining card attributes at block 710. Determinations at block 705 and 710 may be performed by the device or a MOX application to pre-determine capabilities of devices, cards and user interface actions.

According to on embodiment, determining device capability at block 705 includes determining capabilities of a device that may be accessible or presented by a graphical element in the user interface. According to one embodiment, cards may be assignable to a device based on a capability matching of the card and the device. By way of example, the card type, or functionality, may allow for interoperation with one or more device functions. By way of further example, a device including display or media operations may be assigned a card associated with the display or media operations. In a similar fashion, a device configured for control (e.g., lighting, home automation, etc.) can be assigned a card directed to settings for the device, including display or media operations may be assigned a card associated with the display or media operations. The device capability may be based on a profile generated for the device within the MOX application. In certain embodiments, device profiles may be similar for similar types of devices. Determining device capability at block 705 may include processing stored information for devices accessible to the user interface device. Alternatively, or in combination, determining device capability at block 705 may include requesting device capability via the MOX application.

Determining card attributes at block 710 can include determining one or more of profile information, capabilities, functions, restrictions and card formatting according to one or more embodiments. At block 710, card attributes may be determined for cards displayed by the user interface, cards in queue for display, and cards that may be scrolled to by the user interface configuration. Card attributes determined may include supported device types, functionality associated with the cards, card limitations, etc. According to one embodiment, process 700 may determine device capability at block 705 and determine card attributes 710 contemporaneously and/or prior to interface commands are generated or applied to the user interface. Blocks 705 and 710 may be performed independently and separately of one another in certain embodiments. In certain embodiments, blocks 705 and 710 may be performed by process 700 based on display changes to the user interface, selection of a device, selection of a card and/or movement of a card.

Process 700 includes detecting an interface command at block 715. The interface command may relate to one or more commands within the user interface to assign a card to a device. In one embodiment, the interface command may include detection of a card assignment to a device. By way of example, the user interface may allow for a card to be selected (e.g., touch, etc.) at a first portion of the user interface (e.g., row 333) and dragged to a second portion of the user interface (e.g., row 331), the second portion relating to a graphical display for a device.

Based on the detected interface command, process 700 may include determining assignability at block 720. In one embodiment, cards may be assigned unless the card is restricted, incompatible, or already assigned to the selected device. According to one embodiment, determining if a card is assignable at block 720 may be determined by the MOX application during the interface command. In that fashion, the user interface can present one or more bumps or notifications (e.g., "NO" path out of decision block 720) to indicate that the card may not be assigned at block 730. Presenting user interface at block 730 may allow for the user of the MOX application to be notified that the selected card is not compatible for assignment.

Alternatively, the user interface may update the user interface and/or card profile (e.g., "YES" path out of decision block 720) to indicate that the card has been assigned. When the card may be assigned, the MOX application can update the card profile at block 725. Updating a card profile at block 725 may include updating the card metadata stored by the MOX application to recognize the assignment of the card to a device.

Figure 8:
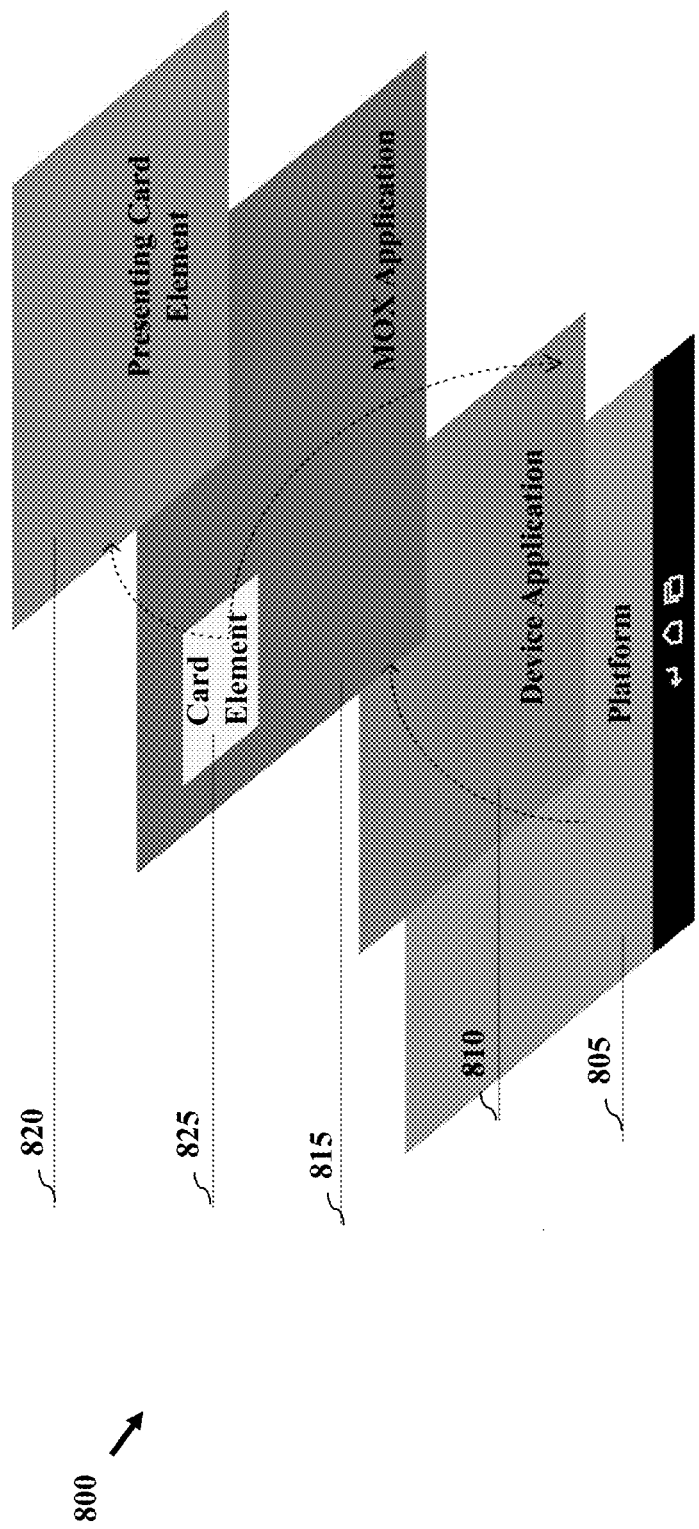
FIG. 8 depicts a graphical representation of card, application and device configuration according to one or more embodiments.

FIG. 8 depicts a graphical representation of card, application and device configuration according to one or more embodiments. FIG. 8 depicts platform layers 800 representing layers that may be employed for a card based application user interface and devices. Platform layers 800 may be implemented and configured for a device such as device 105 of FIG. 1A. Platform layers 800 can be configured to include platform 805. Platform 805 can be an operating system (e.g. iOS, Android, Windows, Unix, and Linux). Platform 805 or operating system is software that manages computer hardware and software resources and provides common services for computer programs. The operating system is an essential component of the system software in a computer system. Application programs usually require an operating system to function.

Device application layer 810 can operate within the platform 805 and may relate to a set of computer programs designed to permit functions, tasks, or activities.

MOX application layer 815 is can operate within the device application 810 to present a user interface with graphical elements to represent entities (e.g., devices, spaces, etc.) and card elements 825. MOX application 815 can graphically display a user interface and graphical elements for one or more card elements 825. In one embodiment, card elements 825 may be displayed by preloading a protocol stack and also loading web-based elements based on the card content. The protocol stack can be more then one layer of loading protocols for displaying content associated with a card element for a device. Additionally, preloaded protocol stack can be used with another card element selection being display to quickly load card content with minimal latency. In one embodiment, an application may provide card application preloading, the application may employ one or more processes, systems and devices for preloading and dynamic web importing for presentation of content on a UI.

Presenting card element 820 relates to graphical display of card element 825 in one or more views. For example, a detail view for a card element can be based on a preloaded protocol stack while loading new web-based elements content associated with the card element 825 for graphical display. The preloaded protocol stack can be used for multiple card elements 825 to quickly display card content in detail view with minimal latency. In that fashion, the protocols may be recycled or employed without having to re-load previously loaded protocols. Card elements 825 can be incorporated into either the part of the stack (e.g., cross platform and platform specific) or can be separate.

Architecture

One aspect of the disclosure is to provide a system, method, devices and applications for providing an application. In one embodiment, a mobile operating system/experience (MOX) application is provided. A MOX application can relate to an application that can be executed by one or more devices including the use of card elements. Other embodiments are directed to application functions and configuration of an application to provide one or more device functions. System components may be directed to devices and servers configured to run an application. In addition features and capabilities of the application and system may be based on, or built around, card elements and their functionality. Configuration of devices are described as architectural aspects. Architectural aspects of the MOX application can include card configuration, a platform for operating with mobile device OS, and underlying processes for card exchange functionality. In one embodiment, architectural aspects of the MOX application relate to the card configuration, platform for operating with mobile device OS, and underlying processes for card exchange functionality. One embodiment is directed to processes for presentation of a user interface and a device configured to present a user interface, such as MOX, with cards.

According to one embodiment, devices may be configured based on an application platform, processes and device configurations for operating within a MOX platform. MOX may provide a common UI for multiplatform devices, such as a single unified way to control or know even though devices are not connected. The MOX architecture may include one or more of the following attributes: use of cards as containers, defined card architecture, card based metadata (Json Metadata). MOX may allow for spaces and provide a visual of all spaces based on connection. MOX may include a prioritization algorithm based on proximity, known/history, places with access, etc. MOX may allow for a search of virtual spaces. MOX may be configured with a MOX stack and MOX plugin, and security features. MOX may allow the same card to provide different actions on different devices. May be configured to publish card into any device (virtual or real).

Capabilities and content may be shared via a card metaphor. According to one embodiment, card element may be provided for other applications. The application can provide features that can leverage local/mesh networks for social experience (chat, video, content discussion). The application can be configured to recognize spaces and seeing all spaces based on connection. In one embodiment, a prioritization algorithm may be employed in the MOX application based on one or more of proximity, known/history, places with access, etc. The MOX application can allow for search of virtual spaces, viewing all devices, a MOX stack and MOX plugin, and security features. The MOX application can allow for multiple instances of a card. Additionally cards may be created to include the same functionality/metadata such that the same card has different actions on different devices. In addition, cards may be published into any device (virtual or real).

Figure 9:
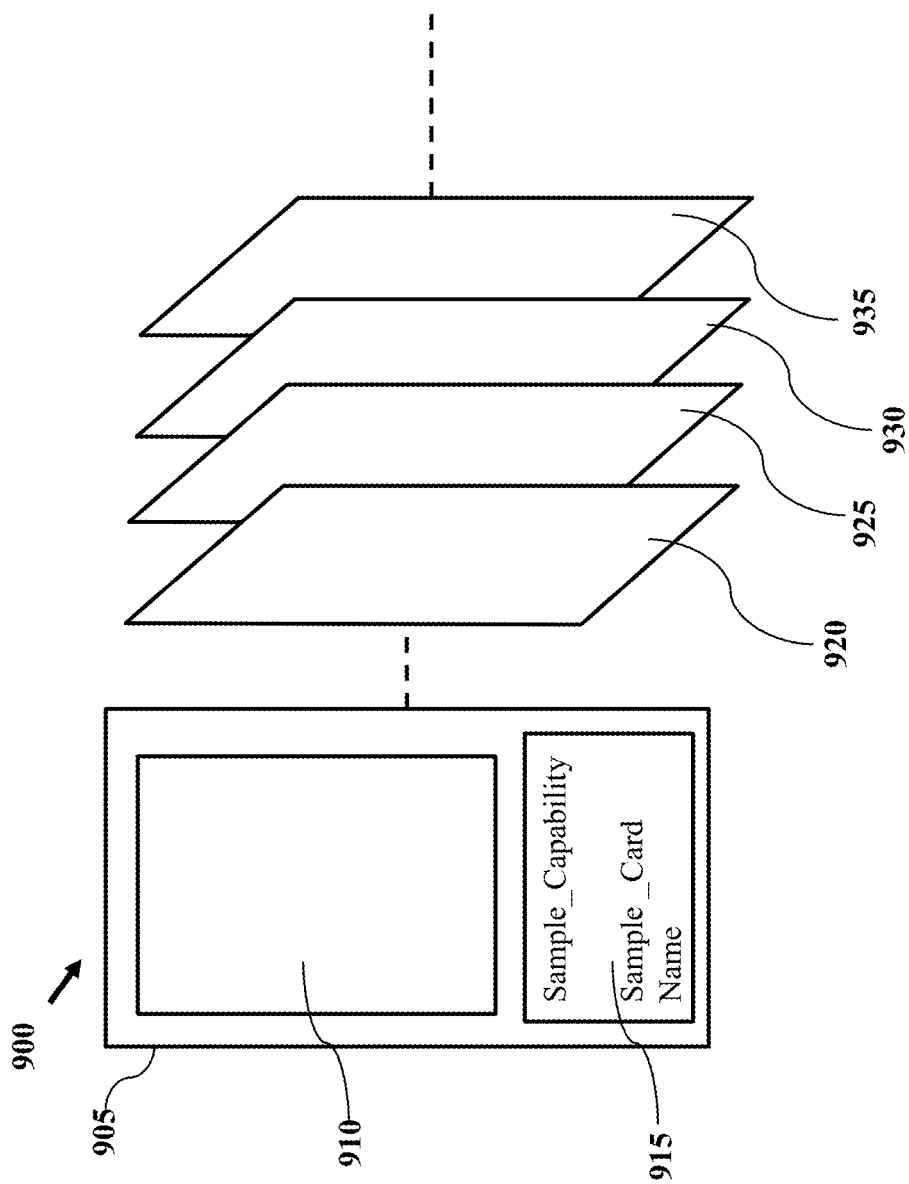
FIG. 9 depicts a graphical representation of card configuration according to one or more embodiments.

FIG. 9 depicts a graphical representation of card configuration according to one or more embodiments. Card element 900 may be a MOX card element. In certain embodiments, a MOX card itself is an HTML object, containing relevant resources related to color pallet, and branding, as well as the interactive components. Both the front and the back of the card are supplied by the device itself, and are validated by the cloud. Card element 900 may include several layers to allow for the card element to function and be used within an application where layers of the card have a different function. FIG. 9 depicts an exemplary representation of card element 900 as may be displayed. By way of example card element 900 may be displayed as graphical element 905 which includes image 910 and description 915. Image 910 may be specified by a user of the application or generated by the application. Image 910 may be employed to identify the card element. Description 915 may be user specified or similarly defined by the application. Description 915 may provide a name, type, and/or brief description of the card element 900 in text.

Presentation of card element 900 as graphical element 905 may employ interface layer 920 to define the graphical elements (e.g., image 910, description 915, etc.). Interface layer 920 may provide the user interface graphical elements that enables presentation but also reduce the amount of data to be processed (as opposed to the entire card) in order to present graphical elements for display of card element 900. HTML layer 925 can provide one or more web-based protocols or formatting. JavaScript layer 930 can include web-based elements can include but are not limited to CSS, JavaScript, and HTML5. Metadata layer 935 (e.g., JSON) can relate to metadata associated with the card that may define the card type, card content, card functionality, etc. According to one embodiment one or more layers of card element 900 may be pre-loaded for interoperation with a user interface of an application. It should be appreciated that card element 900 may include one or more additional or different layers.

According to one embodiment, presentation of card element 900 can introduce color into modular layout. Layout of the card element 900 may also be configured with a color pattern associated with cultural perspectives. According to another embodiment, the outer border of card element 900 may be presented to visually differentiate offerings and/or allude to potential movement of card element 900. Border edges of card element 900 can also manage the amount of information presented and include a contextual menu within the card footprint.

Card element 900 may be presented as a summary view and/or a detailed view. The summary view can include content associated with pre-loading of a protocol stack and interface layer 920. Summary view can include a brief description of content associated with the card element 900. In another embodiment, preloaded protocol stack can be used for displaying content associated with card element 900 for a detailed view within the application. A detailed view of card element 900, for example, can include a discussion of a card type, such as a web card, which is not displayed in the summary view. However, access to the detailed view of the card element may result in display of the discussion in at least a portion of the display of the card element as a detailed view. Web card functions may include one or more of generating a web card, embedding a web card from broadcasts to a MOX display, and commenting features.

According to one embodiment, card element 900 may be imported to an application. By way of example, elements displayed or presented in a native application can include MOX as a selection from a drop down menu so that elements/documents can be added to MOX. Following the selection, a template is selected, information is received regarding a description of the card element, privacy, tag, expiration, location (map) and comments and representative photo for creation of the card element 900 in one exemplary embodiment.

According to one embodiment, card element 900 may be configured as a card container configured to retain the metadata associated with a card. By way of example, card element 900 may contain the QUID values needed to track owner, creator, sender, instance, and card master. This metadata is associated with the card and validated by the cloud publishing services.

Card element 900 may be configured in a plurality of configurations to provide a plurality of card types. In addition to the card types discussed herein, card element 900 may be a combination of one or more card types discussed herein. Alternatively, and/or in combination, a card may be presented as a fusion of two cards together. By way of example, the fusion may relate to presentation of card element 900 with a portion of the display features relating to a first card, and a portion of the display features relating to a second card.

In one embodiment, card element 900 may be configured as a shortcut card configured to launch an application that is external to MOX application. By way of example, the MOX application may be ran on a device which presents a MOX user interface. The device executing the MOX application may include a native application (e.g., operating system, platform, etc.). Selection of a shortcut card element from the MOX user interface can prompt/initiate execution or startup of an application resident on the device or to be executed by the native application. In that fashion, the MOX application can interoperate, and/or at least initiate other programs from the MOX user interface.

In one embodiment, card element 900 may be configured as a content card. A content card may represent a document or file in the version of a card. As such, selection of the content card may launch presentation of the document. A content card can present a preview of the content with the card display format as well as include the entire data (e.g., PDF's, image, contacts, etc.). One type of content card may be a image card for image files, wherein the summary view provides a preview of one or more image files. When the content card relates to a file type, for example, a spreadsheet file, the presentation of the card element in the summary view may include a image of the particular file itself or a representation of the file type. One type of content card may be a web card. A web card can be created with an item of interest, such as an interest card, and can include image data in the summary view, and a brief description of the item. In a detailed view, the web card can include content (e.g., image of a webpage, etc.) and additional information associated with the item of interest. As an interest card, the web card can be viewed and account for the number of times viewed, shared, etc. The MOX can track number of check-ins, last time a card was viewed, and provide metrics for card access in the display of the card element, such as a detailed view.

In one embodiment, card element 900 may be configured as an interactive card to provide functionality with purpose built light interactions. By way of example, a list card may be an interactive card. The list card may be a listing of items (e.g., shopping, to-do list, checklist, etc.) which may be incorporated into a card element. The shopping list card can include a graphic list in the summary view and an intractable list in the detailed view. The list card function may include one or more of processes, systems and devices for providing, hanging and updating a list card. The list format is retained across devices and more than just text can be shared.

A widget card can provide a unique functionality that is purpose built for more intensive features such as control of a device (e.g., thermostat, TV, media player, etc.) with interactive controls based on or tailored to the particular device for control. By way of example, card element 900 may be a settings card including settings for a particular device that can be controlled using the user interface to control a device. The settings card may be associated with capabilities of a device. For example, a card may be associated with picture settings for a TV, media downloaded for the TV, a remote control for the TV, etc. The settings card operation may include one or more of processes, systems and devices for using a settings card. Settings cards may be applied to a display device, internet of things (IoT) devices, and may be profiled based on preferences.

In another embodiment, card element 900 may be a now playing card, associated with media, music or video including the name of the media playing and additional information to be displayed with a card. The now playing card may be presented during playback of media and may be removed from the display once playback has stopped. In another embodiment, card element 900 may be configured as a door bell card that allows for selection of the card to alert another user of MOX that is associated with the card.

In one embodiment, card element 900 may be configured as a gaming card. Gamification of card elements, such as a "you're it" card, card can be sent to "tag" a user. The tag functionally may display to a user in the user interface that they have been tagged and include a message from the sender. Gamification can include a point system based on access to the MOX application wherein points are collected and tallied by the MOX application based on usage. The points may be used for purchases, such as other cards, and/or for rewards. In one embodiment, MOX may provide a social feed card. The operation may include one or more of processes, systems and devices for presenting portions of a social media account within a MOX user interface.

In one embodiment, card element 900 may be configured as a challenge card. The challenge card can include a description of the challenge, and may include a timer. Based on access to the card, a user can accept the challenge to complete.

In one embodiment, card element 900 may be configured for payment and/or transactions. Card elements may be configured for payment, rewards clubs, banking, transit costs, etc. The payment card operation may include one or more of processes, systems and devices for providing payments via card and associating a card with payment, identity, etc.

In one embodiment, card element 900 may be a single use card. Single use cards may include one or more of processes, systems and devices for exchanging a singe use card. Single use cards may include formatting of card to provide a single use and use with card purchasing (e.g., gift cards, stationary, etc.).

In one embodiment, card element 900 may be configured to provide mirror control. The operation may include one or more of processes for providing mirror image of MOX interface onto another device, embedding a card from broadcasts to MOX display and interacting with a store.

In one embodiment, card element 900 may be configured as a novelty card. A novelty card may be an image card, such as a trading card. The novelty cards can be associated with sports paraphernalia. Novelty cards can be created for family members. Novelty card may be a sports card with an image and text associated with the individual or subject of the image. As such, card element 900 may used to encapsulate a picture, sports team, year, number and images or video. Novelty cards or other cards can be personalized with graphical elements or stickers associated with points of interest, such as organizations, professional sports teams, etc. The badge may be a card associated with connections to a particular item of interest.

In one embodiment, card element 900 may be configured as a warranty card. The warranty card may be created to provide warranty information for a device. The warranty card may be a particular format, such as pdf. A summary view of the warranty card can provide image of the product, a name, and card type. A detailed viewed can provide device particulars such as product model, size, capabilities, warranty terms, file information and comments.

In one embodiment, card element 900 may be video link card to provide notice of chat available. A video link card may be sent in MOX to allow or initiate connection, such as video feed or chat, between two or more devices.

In one embodiment, card element 900 may be personal tracker card for tracking locations of a user. The tracking card can include map displays to show locations of the user, places the user has visited, and the location of one or more other entities in MOX. Regarding goal tracking, such as health tracking, can be tied to a wearable device to track activity, calories burned, distance or other goals. The user interface can present a graphic, in either the card summary or detailed view, providing a display of progress toward a goal, the current level, the goal amount and performance metrics in general.

In one embodiment, card element 900 may be a greetings card. Card element 900 may relate to a one time use or single instance card which can be created or purchased as greetings cards (e.g., birthday, sympathy, congratulatory, etc.). Similarly, card element 900 may be a goodness card that includes a message than can be sent to deliver positive messages/goodwill. The goodness card may be tracked to see how may user open, send, received, etc. By tracking the goodness card, the user interface can present a map or graphic illustrating the reach of the goodness card. Card element 900 may be a birthday card, graphic message including name of recipient, etc. in certain embodiments, card element 900 may be associated with a greetings card pack, or collection of multiple card elements.

In one embodiment, card element 900 may be configured to provide connectivity to a device or network, such as WI-FI, home network access. The card can include credentials for access to the network in residential or public spaces.

In one embodiment, card element 900 may be contact card. The contact card can include an image for the contact, contact information, company name, etc. Card element 900 may be used as digital note passing including a user photograph and message, and a description of the note. As such, card element 900 can be used for chatting, sending a questions and conversations. Text messages of card element 900 can include a quotation, author of the quote, and source information associated with the note. In one embodiment, card element 900 may be schedule card including an image or text message for task to be completed and the due date for the task. Card element 900 may include location information including an address and map data associated with the location.

According to another embodiment, card element 900 may be a social card associated with one or more social media applications. The social card can relate to a micro-application for providing a social media account or accounts within the MOX user interface. In other embodiments, card element 900 can encapsulate a function or features of a social media account such as a message, image, status, etc.

In one embodiment, card element 900 may include advertisements incorporated into presentation of a card, such as a coupon or product placement.

Figure 10:
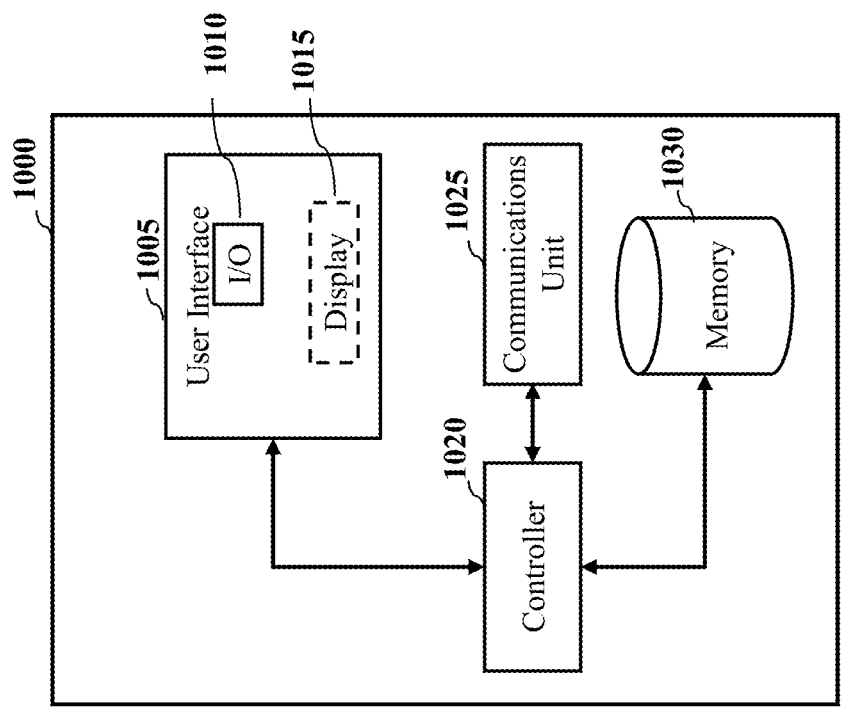
FIG. 10 depicts a simplified diagram of a device according to one or more embodiments.

FIG. 10 depicts a simplified diagram of a device according to one or more embodiments. Device 1000 may relate to one or more devices for providing an application, such as a MOX application. According to another embodiment, device 1000 may relate to one or more devices configured to run a MOX core. In one embodiment, device 1000 relates to a device including a display, such as a TV, mobile device, or device having a display in general. According to another embodiment, device 1000 may be devices, such as a set-top box, configured to output content to a display device. According to another embodiment, device 1000 may be devices without a display. As shown in FIG. 10, device 1000 includes controller 1005, graphical user interface 1010, communications unit 1015 and memory 1020.

Controller 1005 may be configured to execute code stored in memory 1020 for operation of device 1000 including presentation of a graphical user interface. Controller 1005 may include a processor and/or one or more processing elements. In one embodiment controller 1005 may be include one or more of hardware, software, firmware and/or processing components in general. According to one embodiment, controller 1005 may be configured to perform one or more processes described herein. Graphical user interface 1010 may be configured to receive one or more commands via an input/output (I/O) interface 1025 which may include one or more inputs or terminals to receive user commands. When device 1000 relates to a TV, I/O interface 1025 may receive one or more remote control commands.

Controller 1005 may be configured to run a MOX application, the MOX application including one or more card elements, restful APIs a MOX core and a MOX configuration.

Figure 11:
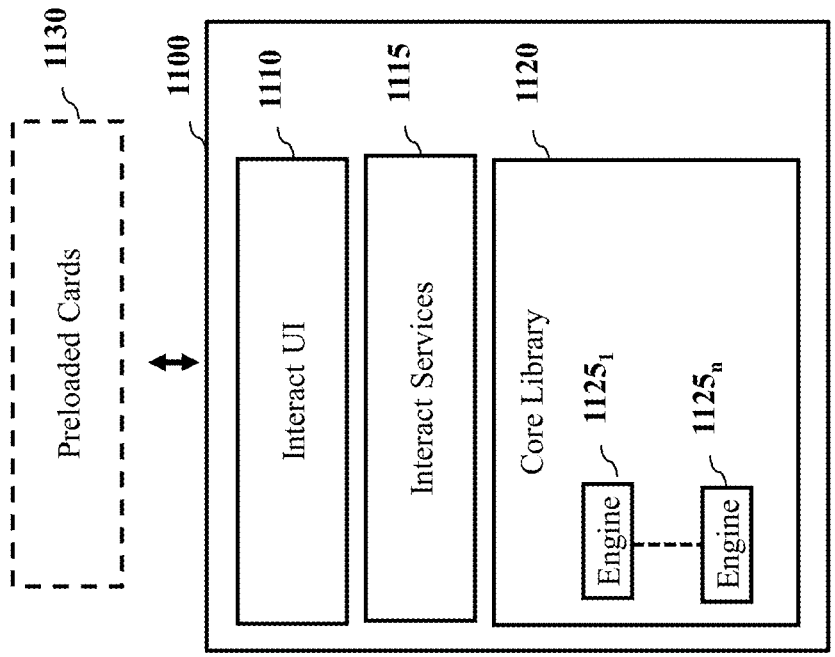
FIG. 11 depicts a graphical representation of elements/layer of an application according to one or more embodiments.

Communications unit 1015 may be configured for wired and/or wireless communication with one or more network elements, such as servers. Memory 1020 may include non-transitory RAM and/or ROM memory for storing executable instructions, operating instructions and content for display, FIG. 11 depicts a graphical representation of elements/layers of an application according to one or more embodiments. In one embodiment an application as discussed herein, such as a MOX application, may be configured with one or more services/functionalities and a portable core. FIG. 11 depicts application 1100 and core elements of application 1100. According to one embodiment, application 1100 includes and interact user interface (UI) element 1110, interact services element 1115 and core library 1120. Application 1100 may be configured to run including one or more card elements, restful APIs, a MOX core 1120 and a MOX configuration.

According to one embodiment, devices may be configured to run a MOX Application based on the device type. As such, application 1100 and core computing structures may be configured for high and/or low interactive devices. Application 1100 may be configured to operate with a particular platform, (e.g., android, operating system, etc.) and/or may be embedded with or without head Linux devices.

According to one embodiment, application 1100 can leverage and interoperate with existing technologies that already handle various functions, including matching capabilities by displaying complementary endpoints between devices. A capability card is only shown when two complementary functions are available, such as in DLNA (A controller and a renderer).

Interact user interface (UI) element 1110 may be a layer associated with presentation of a user interface. Certain devices may include displays and utilize a user interface for presentation of a MOX application. Accordingly, UI element 1110 may be configured to present a user interface, such as the user interface described herein for presentation of card elements, exchange of card elements and interaction with a user. For devices without a display or input/output, UI element 1110 may not be required to execute the MOX application. Accordingly, in that embodiment the MOX application may be loaded without the UI element 1110. UI element 1110 may provide smooth transparent interaction for application 1100, UI element 1110 may leverage native platform permissions to support presentation of the user interface. For example a native application service layer manager may bridge between the high level UI, and the low level system components. Interact services element 1115 may be responsible for the services and device interaction. Interact services element 1115 may contain the relevant logic to handle multiple devices.

Interact services element 1115 may be a layer associated with interaction between one or more MOX devices. Certain devices may be configured to discovery and interact with other devices using a MOX application. Interact services element 1115 may provide each devices its capabilities. By way of example, the application 1100 may be configured to notify the ecosystem and/or one or more devices associated with application 1100 when there is something to communicate. Devices associated with application 1100 can respond instantly when requested to take action. Devices within the ecosystem can be shared at the capability level.

Core library 1120 can include one or more engines $1125_{1-n}$ configured to provide functionality or handling of data and actions within the application. According to one embodiment, core library 1120 can include one or more engines $1125_{1-n}$ associated with at least one of a Discovery & Pairing Engine, Capability Matching Engine, Dynamic Capability Engine, and Profiling Engine. Core library 1120 can allow for the MOX application to run on both high and low level devices, including devices with user interfaces, processors and controllers, such as controllers for appliances. Core library 1120 can support multiple device types. According to one embodiment, core library 1120 does not require a particular platform to be executed, and thus, is portable for operation on many different types of platforms.

In one embodiment, application 1100 is configured with a capability matching engine to compare capabilities from a current device (e.g., device executing the MOX application 1100) and remote devices. The capability matching engine can determine complementary endpoints and functions. In certain embodiments, only complementary endpoints are presented to the upper layers of the application 1100.

In one embodiment, application 1100 is configured with a dynamic capability engine layer to automatically discover the capabilities of the device upon which it is running. The dynamic capability engine layer can support both dynamic discovery of capabilities, and a configuration file based method to support deeply integrated products.

In one embodiment, application 1100 is configured with a profiling engine layer to provide a device's identity. Rather than being a nameless device, the profiling engine layer can ensure a unique identity to the device application 1100 is running on.

In certain embodiments, the application 1100 can operate with preloaded card elements 1130. Preloaded card elements 1130 can relate to one or more card elements that are associated with a device. In that fashion the card elements may be preloaded to operate with the device without requiring loading from a server.

In certain embodiments, application 1100, and a MOX application as described herein, can include one or more security features. According to one embodiment, devices running application 1100 are configured with standard remote and guest access policies designed for security. These policies can be controlled or modified by a user based on individual needs through an interface that would allow dragging one API from the local/authenticated, or "All APIs" pool, to either the "Remote APIs" or the Guest APIs" pools. In one embodiment, an Authenticated/Local configuration can provide full API access and control to authenticated and/or remote devices. In addition, there may be a remote class API access and control setting. In one embodiment, a Not Authenticated/Local configuration provides limited local class API access and control. In one embodiment, a Not Authenticated/Remote configuration provides no access or control. According to other embodiments and with respect to API's in different zones, only a portion of a given API set would be available remotely. This can be reconfigured by from the defaults. APIs that would not be available remotely would fall into the categories of safety concerns and interactive limitations.

Figure 12:
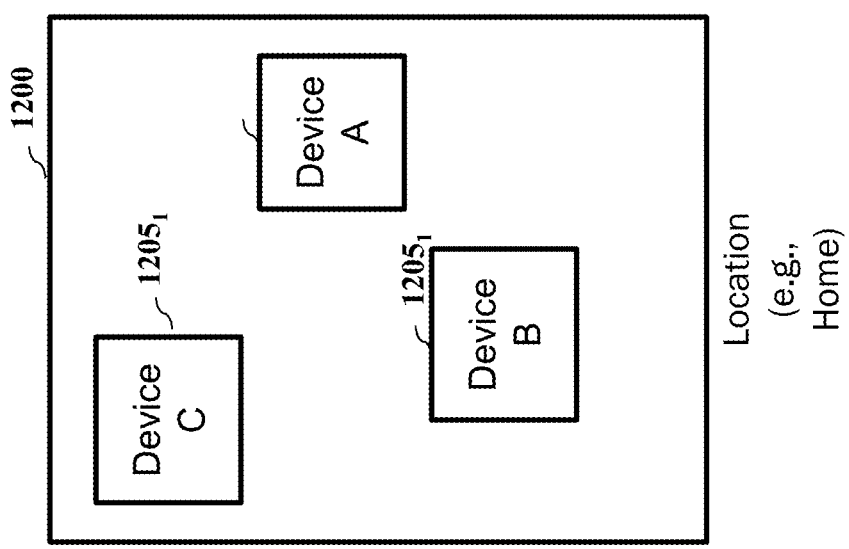
FIG. 12 depicts a graphical representation of devices associated with a zone according to one or more embodiments.

FIG. 12 depicts a graphical representation of devices associated with a zone according to one or more embodiments. According to one embodiment, an application as discussed herein, such as a MOX application, may be configured to operate in accordance with one or more zones. FIG. 12 depicts a graphical representation of zone 1200 with devices $1205_{1-n}$. According to one embodiment, devices $1205_{1-n}$ are running a MOX application. Zone 1200 can represent a logical groupings of devices based on the device location. Zone 1200 can support hierarchies, in which sub groupings can be created to denote rooms, for example.

According to one embodiment, devices $1205_{1-n}$ may be automatically added to a zone, such as zone 1200, based on best fit. New devices may be evaluated by a MOX application based on device proximity and/or involvement with other devices to for the application to select a default zone. Management of zones, and the devices within those zones, can be handled via a cloud/browser interface associated with the MOX application. In certain embodiments, temporary zones are automatically created based on location, in areas such as a hotel, a conference, or a friend's home. According to one embodiment, classes of devices (typical mobile devices) which do not belong to a specific zone, can interact with whatever zone they find themselves in including more than one zone at once.

New devices to zone 1200, through discovery, will receive information about zone 1200 for the devices around them. Within a common environment of devices which have the same zone, zone 1200 can be automatically set on a pairing event with the owner of the zone (e.g., Device C would be added to the "Home" zone by default if Devices A and B were already in the "Home" zone"). Devices which see subzones would be automatically added to the parent zone (Device C would be added to the "Home" zone by default, if Device A and Device B were already part of two other child zones). Top level zones can be determined on connection and relation with other devices within that zone.

Figure 13:
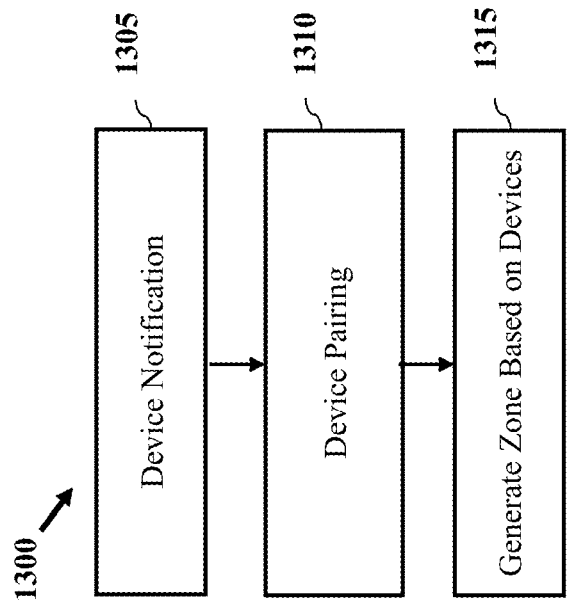
FIG. 13 depicts a process for dynamic discovery according to one or more embodiments.

FIG. 13 depicts a process for dynamic discovery according to one or more embodiments. According to one embodiment, a system associated with the MOX application can be configured with one or more ecosystems. Each ecosystem can include one or more devices associated with the user and the devices that are shared to the user by others. Discovery and pairing can allow for devices to connect and communicate via the MOX application. In certain embodiments a DC/PXE pairing pattern may be employed to obtaining IP addresses, and for obtaining a PXE boot image file name when the MCP server and PXE server reside on the same physical machine. Process 1300 is presented from the reference point of a particular device and/or devices connected by way of the MOX application.

Process 1300 may be initiated by receiving a device notification at block 1305. In one embodiment, devices may transmit messages indicating their presence as a notification to other devices associated with the MOX application, a zone, user, etc. Based on the notification at block 1305, devices can pair at block 1310. Notifications at block 1305 can allow for dynamic discovery of devices including the ability to discover what a device can do, including profiles the device has, without user intervention. Discovery may be based on configuration files generated for each device by the MOX application, such as by the Dynamic Capability Engine. According to one embodiment, a MOX application provides devices have a common language. The MOX application can leverage inherent differences of devices, such as different languages, goals, and functions. In an exemplary embodiment, the MOX application can employ JSON-LD or device communication. Device communication in the MOX application can allow for devices to describe themselves. By way of example, in a scenario of communication between a microwave and a map according to the MOX application, the microwave doesn't need predefined knowledge about what a light is, or what the APIs are. Rather the description for each function would be embedded in a response from the lamp to the microwave. In that fashion, devices interact. In addition, predefined classes or types of devices may be employed by the MOX application to build relationships without the knowledge of the exact APIs of the devices. According to another embodiment the MOX application core may be portable to a wide range of devices and may be written in native C, to ensure that it cross-compiled to any set of devices.

Device pairing at block 1310 may be provided for devices which are not shipped with a MOX application based on through a discovery plugin architecture. Cards attached to a device by relation or virtue of existence are extrinsic in nature, and are instead pulled from the cloud to add to existing offerings. Connectivity based technology can be leveraged through stacked plugins. A compatibility layer of the MOX application may be configured for discovery and pairing to enable extrinsic properties of a device.

Pairing may be based on device compatibility, a user profile, etc. At block 1315, a zone such as zone 1200, may be generated based on the paired devices. Device pairing may employ a DORA-RA procedure discussed in FIG. 14. Pairing and subsequent booting can be completely transparent to users of the application. A device discovery and pairing engine of the MOX application can be provide discovery and pairing of devices based on Multicast UDP broadcasts, which can operate over any physical layer supporting direct networking.

According to one embodiment, pairing may be performed for virtual devices. Virtual devices may include non-connected, or alternatively connected, devices. Virtual devices do not retain their own connectivity, or do not include MOX if they are connected. Detection of virtual devices can be handled by at least one of scanning a barcode, photo/Image recognition using a camera, manual entry, and/or near field communication (e.g., RFID, etc.). Once a device is recognized, the device appears within the interface. As such, the device may appear in the MOX user interface as a device. Virtual devices may not be controlled.

Figure 14:
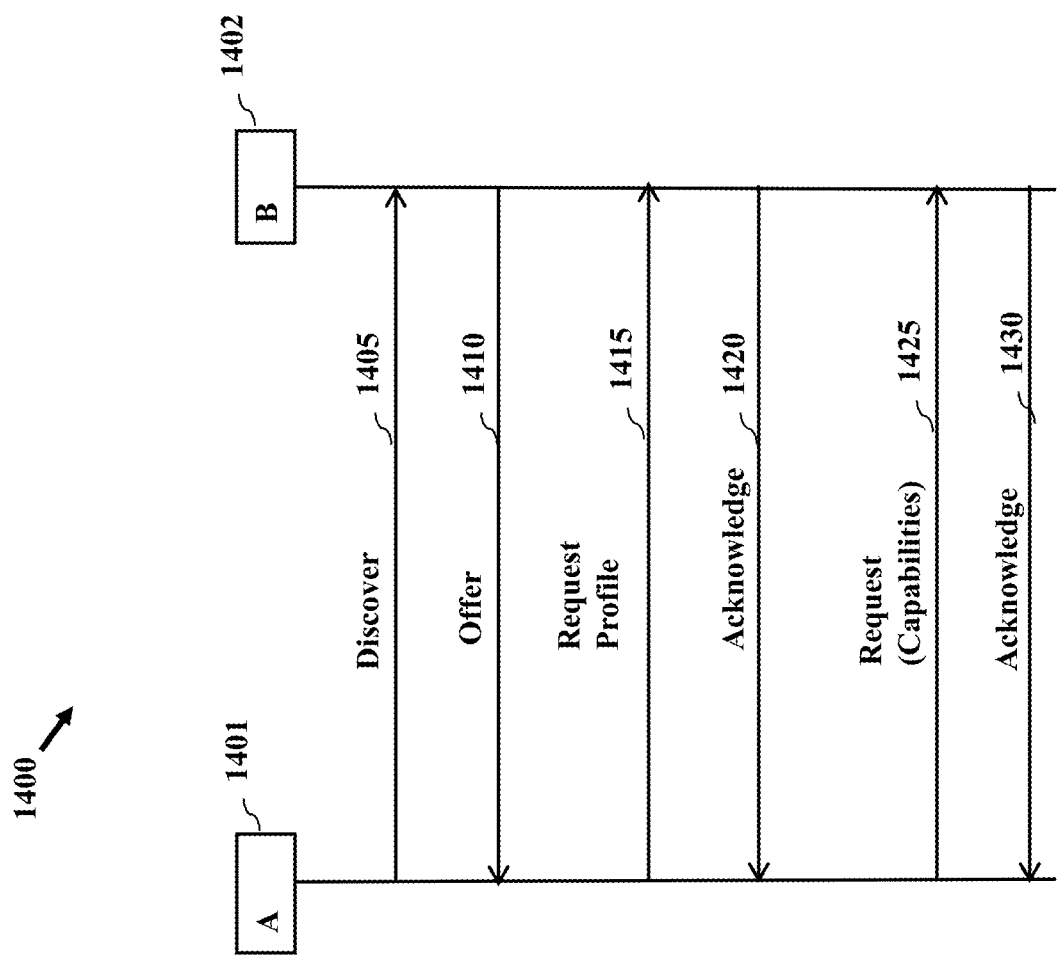
FIG. 14 depicts a process a graphical representation of device discovery and pairing according to one or more embodiments.

FIG. 14 depicts a graphical representation of device discovery and pairing according to one or more embodiments. According to one embodiment, devices running an application, such as a MOX application, and/or devices executing a MOX core can allow for communication between the devices and exchange of data for one or more functions. FIG. 14 depicts process 1400 for device discovery and pairing. Discovery between devices or entities having a MOX core can allow for device capabilities and services within an ecosystem of devices running the MOX application. Process 1400 may also be employed for resource sharing.

Process 1400 may be employed by a device, such as a MOX device, to identify devices associated with one or more entities or zones. In certain embodiments, process 1400 relates to a identification of devices and services within an ecosystem, such as a personal ecosystem.

Process 1400 is depicted relative to entities A and B, shown as entities 1401 and 1402, respectively. Process 1400 may be performed by engines and functionality of an application executed by each of entities 1401 and 1402, such as a MOX application. Accordingly, process 1400 may be performed without necessarily requiring user input. Process 1400 may allow for devices associated with a particular account, user, location (e.g., physical, virtual, etc.), zone, or entity to exchange capabilities, pair, allow for control, etc. Transmissions/exchange messages in process 1400 may be performed by one or more of local short range communication, local network communication, network communication in general and combinations thereof.

Process 1400 may relate to a conversation between devices based on the core elements included by a MOX application of each device. By way of example, process 1400 may relate to device pairing (e.g., device pairing at block 1310). Process 1400 may employ a DORA-RA process (e.g., Discover, Offer Request, Acknowledge, Request, and Acknowledge). Entity 1401 can transmit discover message 1405 which can be received by entity 1402. Discover message 1405 may be sent periodically by way of local short range transmissions and/or via one or more network protocols including wired and wireless communications. Discover message 1405 may employed to determine if any devices are available for communication with entity 1401 via the application, such as a MOX application. When discover message 1405 is received by entity 1402, offer message 1410 may be transmitted by entity 1402 to entity 1401. Offer message 1410 may provide a response to notify that another device is present. Request profile message 1415 may query a device's profile. Acknowledge 1420 may provide a response including the device profile that is configured according the MOX application. Process 1400 may be performed by a profiling engine of the MOX application to ensure that a device profile is present. If the profile is not complete at the time of discovery, the profiling engine can complete the broadcast. The profile can contain based information on device type and device ID. The profile may provide a contact for device 1402. Discovery and pairing of the two devices may initially be handled by UDP, while capability exchange may be handled via TCP.

Request capabilities message 1425 may query device capabilities. Message 1425 may be handled either lazy, or on demand if the device is selected for interaction prior to being analyzed. Acknowledge 1430 may provide a response including the device capabilities according the MOX application. Capabilities which are fetched outline what a device is capable of performing.

Process 1400 may be used for obtaining an IP address, and for obtaining a PXE boot image file name when the DHCP server and PXE server reside on the same physical machine. Pairing and subsequent booting are completely transparent. Discovery and pairing for two devices using process 1400 may be handled, at least initially, via UDP. Capability exchange may be handled via TCP.

Process 1400 provides resource sharing among devices. Interaction between devices 1401 and 1402 allows for a common language (e.g., MOX application), self description of device capabilities, devices can describe APIs, interactions, and capabilities. In that fashion, devices can understand complementary capabilities, and make use of related capabilities. Devices can also react to the needs of other devices. For MOX enabled devices, RESTful APIs are presented in a manner that explains what the devices do, and how they can be used. The devices themselves provide the card and interaction point for control. The interaction point for control can be customized based on templates, and include branding.

It will be appreciated that all of the disclosed methods and procedures described herein can be implemented using one or more computer programs or components. These components may be provided as a series of computer instructions on any conventional computer-readable medium, including RAM, ROM, flash memory, magnetic or optical disks, optical memory, or other storage media. The instructions may be configured to be executed by a processor, which when executing the series of computer instructions performs or facilitates the performance of all or part of the disclosed methods and procedures.

Although several features and embodiments are discussed relative to a MOX application, it should be appreciated that principles and teachings of the disclosure are not limited to MOX applications.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims While this disclosure has been particularly shown and described with references to exemplary embodiments thereof, it will be understood by those skilled in the art that various changes in form and details may be made therein without departing from the scope of the claimed embodiments.

What is claimed is:

1. A method for controlling device operation, the method comprising:
    presenting, by a controller of a first device, a user interface for an application including a listing of other devices accessible to the first device, and wherein the user interface presents a device row for a selected other device, the device row displaying a plurality of device card elements associated with the selected other device, wherein the other devices are associated with a zone based on location and each other device transmits messages to indicate presence and to describe device abilities including exchange of device capabilities;
    detecting, by the controller, a command for the user interface of the first device, wherein the command is associated with assigning a card element displayed by the user interface to the selected other device, and the command is an exchange of the card element for exchange of at least one of content and capabilities of the card element relative to the device and the selected other device of the user interface,
    wherein the user interface and the card element are displayed by the first device and
    wherein operation of the first device for presentation of the user interface is based on a platform for operation with card elements and one or more entities, the one or more entities including the selected other device;
    determining, by the controller, at least one capability of the selected other device based on the command and the platform for operation with the card element, wherein determining includes interoperation of the user interface with the platform, and wherein determining includes accessing entity information for the selected device based on a profile generated for the device within the platform for operation with card elements and for self description of device capabilities, capability information for the card element and card metadata; and
    controlling, by the controller, operation of the device based on said determining, wherein controlling includes controlling exchange of a card element relative to the first device and the selected other device, wherein the platform for operation with card elements updates a card profile for the card element including updating card metadata stored by the platform for operation with card elements to recognize assignment of the card element to the selected other device.

2. The method of claim 1, wherein the command is a selection of a card element for access to content associated with the card element and presentation of the content by the user interface.

3. The method of claim 1, wherein the command is a user interface command to associate the card element presented as a graphical element including an image and a description in the user interface.

4. The method of claim 1, wherein the platform is an application platform for operation on the first device and across a system to provide a common platform for one or more device types.

5. The method of claim 1, wherein the platform includes a discovery and pairing engine, a capability and matching engine, dynamic capacity engine and profiling engine.

6. The method of claim 1, wherein presentation of elements of the card element are selectable based on one or more of capability of the card element and applicability of a feature, and wherein elements of the card element are displayed in an unselectable manner when the features of the card element are not compatible with the selected device.

7. The method of claim 1, wherein determining is based on a zone associated with the location of the first device.

8. The method of claim 1, wherein exchange includes duplication of card features of the selected card and data of the selected card to a new card.

9. The method of claim 1, wherein controlling includes updating metadata for a card element.

10. The method of claim 1, wherein the user interface is associated with an application configured to operation across a plurality of devices based on the platform.

11. A device comprising:
    a display; and
    a controller configured to control presentation of a card element for a user interface of a first device, wherein the controller is configured to
    present a user interface for an application including a listing of other devices accessible to the first device, and wherein the user interface presents a device row for a selected other device, the device row displaying a plurality of device card elements associated with the selected other device, wherein the other devices are associated with a zone based on location and each other device transmits messages to indicate presence and to describe device abilities including exchange of device capabilities,
    detect a command for the user interface of the first device, wherein the command is associated with assigning a card element displayed by the user interface to the selected other device,
    wherein the command is an exchange of the card element for exchange of at least one of content and capabilities of the card element relative to the first device and the selected other device of the user interface,
    wherein the user interface and the card element are displayed by the first device and
    wherein operation of the first device for presentation of the user interface is based on a platform for operation with card elements and one or more entities, the one or more entities including the selected other device;
    determine at least one capability of the selected other device based on the command and the platform for operation with the card element, wherein determining includes interoperation of the user interface with the platform, and wherein determining includes accessing entity information for the selected device based on a profile generated for the device within the platform for operation with card elements and for self description of device capabilities, capability information for the card element and card metadata; and control operation of the device based on said determining, wherein control includes controlling exchange of a card element relative to the first device and the selected other device, wherein the platform for operation with card elements updates a card profile for the card element including updating card metadata stored by the platform for operation with card elements to recognize assignment of the card element to the selected other device.

12. The device of claim 11, wherein the command is a selection of a card element for access to content associated with the card element and presentation of the content by the user interface.

13. The device of claim 11, wherein the command is a user interface command to associate the card element presented as a graphical element including an image and a description in the user interface.

14. The device of claim 11, wherein the platform is an application platform for operation on the first device and across a system to provide a common platform for one or more device types.

15. The device of claim 11, wherein the platform includes a discovery and pairing engine, a capability and matching engine, dynamic capacity engine and profiling engine.

16. The device of claim 11, wherein presentation of elements of the card element are selectable based on one or more of capability of the card element and applicability of a feature, and wherein elements of the card element are displayed in an unselectable manner when the features of the card element are not compatible with the selected device.

17. The device of claim 11, wherein determining is based on a zone associated with the location of the first device.

18. The device of claim 11, wherein exchange includes duplication of card features of the selected card and data of the selected card to a new card.

19. The device of claim 11, wherein controlling includes updating metadata for a card element.

20. The device of claim 11, wherein the user interface is associated with an application configured to operation across a plurality of devices based on the platform.

* * * * *